(12) United States Patent
Chickering

(10) Patent No.: US 11,295,232 B2
(45) Date of Patent: Apr. 5, 2022

(54) LEARNING THE STRUCTURE OF HIERARCHICAL EXTRACTION MODELS

(71) Applicant: Microsoft Technology Licensing, LLC, Redmond, WA (US)

(72) Inventor: David Maxwell Chickering, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1193 days.

(21) Appl. No.: 15/798,282

(22) Filed: Oct. 30, 2017

(65) Prior Publication Data

US 2019/0130308 A1 May 2, 2019

(51) Int. Cl.
*G06N 20/00* (2019.01)
*G06F 16/30* (2019.01)

(52) U.S. Cl.
CPC ............. *G06N 20/00* (2019.01); *G06F 16/30* (2019.01)

(58) Field of Classification Search
CPC ......... G06N 20/00; G06N 7/005; G06F 16/30
See application file for complete search history.

(56) References Cited

U.S. PATENT DOCUMENTS

| 8,099,722 B2* | 1/2012 | Fairweather | G06K 13/0825 717/143 |
| 10,304,444 B2* | 5/2019 | Mathias | G06F 40/35 |
| 2006/0225026 A1 | 10/2006 | Henaire et al. | |
| 2015/0019204 A1* | 1/2015 | Simard | H04L 1/0079 704/9 |
| 2016/0012058 A1* | 1/2016 | Franceschini | G06F 16/951 707/728 |

OTHER PUBLICATIONS

Feifan Liu, Jun Zhao, Bibo Lv, Bo Xu, and Hao Yu, "Product Named Entity Recognition Based on Hierarchical Hidden Markov Model", 2005, Proceedings of the Fourth SIGHAN Workshop on Chinese Language Processing, pp. 40-47. (Year: 2005).*

Dima Suleiman, Arafat Awajan, and Wael Al Etaiwi, "The Use of Hidden Markov Model in Natural Arabic Language Processing: a survey", Sep. 19, 2017, The 8th International Conference on Emerging Ubiquitous Systems and Pervasive Networks (EUSPN 2017), pp. 241-247. (Year: 2017).*

Dayne Freitag and Andrew McCallum, "Information Extraction with HMM Structures Learned by Stochastic Optimization", 2000, AAAI-00 Proceedings, pp. 1-6. (Year: 2000).*

(Continued)

*Primary Examiner* — Kamran Afshar
*Assistant Examiner* — Ying Yu Chen
(74) *Attorney, Agent, or Firm* — Schwegman Lundberg & Woessner, P.A.

(57) ABSTRACT

A hierarchical extraction model for a label hierarchy may be implemented by a weighted hierarchical state machine whose structure and/or weights are determined in part from a statistical distribution of label sequences as determined from training data. In accordance with various embodiments, the hierarchical state machine includes one or more non-cyclic directed chains of states representing at least a subset of the label sequences, and transitions weighted based at least in part on the statistical distribution.

20 Claims, 13 Drawing Sheets

(56) References Cited

OTHER PUBLICATIONS

Jun Suzuki, Erik McDermott, and Hideki Isozaki, "Training Conditional Random Fields with Multivariate Evaluation Measures", 2006, Proceedings of the 21st International Conference on Computational Linguistics and 44th Annual Meeting of the ACL, pp. 217-224. (Year: 2006).*
Definition of "automatically" [online], Oxford English Dictionary, second edition. 1989. Available at: https://www.oed.com/oed2/00015192 (Year: 1989).*
Lu et al., "Hierarchical Conditional Random Fields (HCRF) For Chinese Named Entity Tagging", Aug. 24-27, 2007, Third International Conference on Natural Computation (ICNC 2007), pp. 1-5. (Year: 2007).*
Bouqata, et al., "Vogue: A Novel Variable Order-Gap State Machine for Modeling Sequences", In Proceedings of the European Conference on Principles of Data Mining and Knowledge Discovery, Sep. 18, 2006, pp. 42-54.
Xie, et al., "Data Mining for Software Engineering", In Journal of Computer, vol. 42, Issue 8, Aug. 7, 2009, pp. 55-62.
"International Search Report and Written Opinion Issued in PCT Application No. PCT/US2018/056958", dated Jan. 9, 2019, 13 Pages.
"Finite-State Machine", Wikipedia, [online]. [retrieved on Nov. 9, 2017]. Retrieved from the Internet: <URL: https://en.wikipedia.org/wiki/Finite-state_machine>, updated Oct. 28, 2017, 9 Pages.
Miro, Samek, "Introduction to Hierarchical State Machines (HSMs)", Retrieved From <<https://barrgroup.com/Embedded-Systems/How-To/Introduction-Hierarchical-State-Machines>>, May 4, 2016, 24 Pages.
Lafferty, et al., "Conditional Random Fields: Probabilistic Models for Segmenting and Labeling Sequence Data", In Proceedings of the Eighteenth International Conference on Machine Learning, Jun. 28, 2001, 10 Pages.
"Office Action Issued in European Patent Application No. 18804738.5", dated Feb. 15, 2021, 7 Pages.
"Summons to Attend Oral Proceedings Issued in European Patent Application No. 18804738.5", Mailed Date: Sep. 2, 2021, 9 Pages.

* cited by examiner

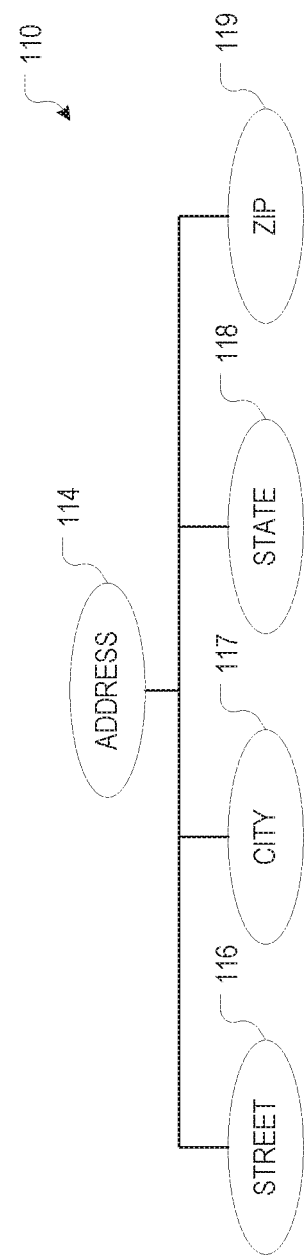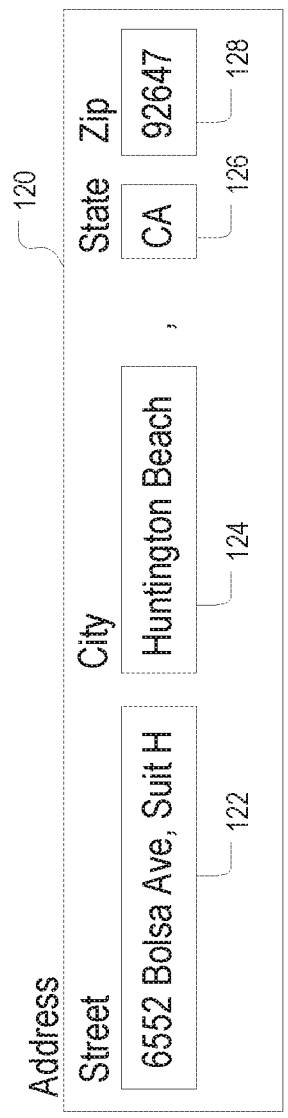

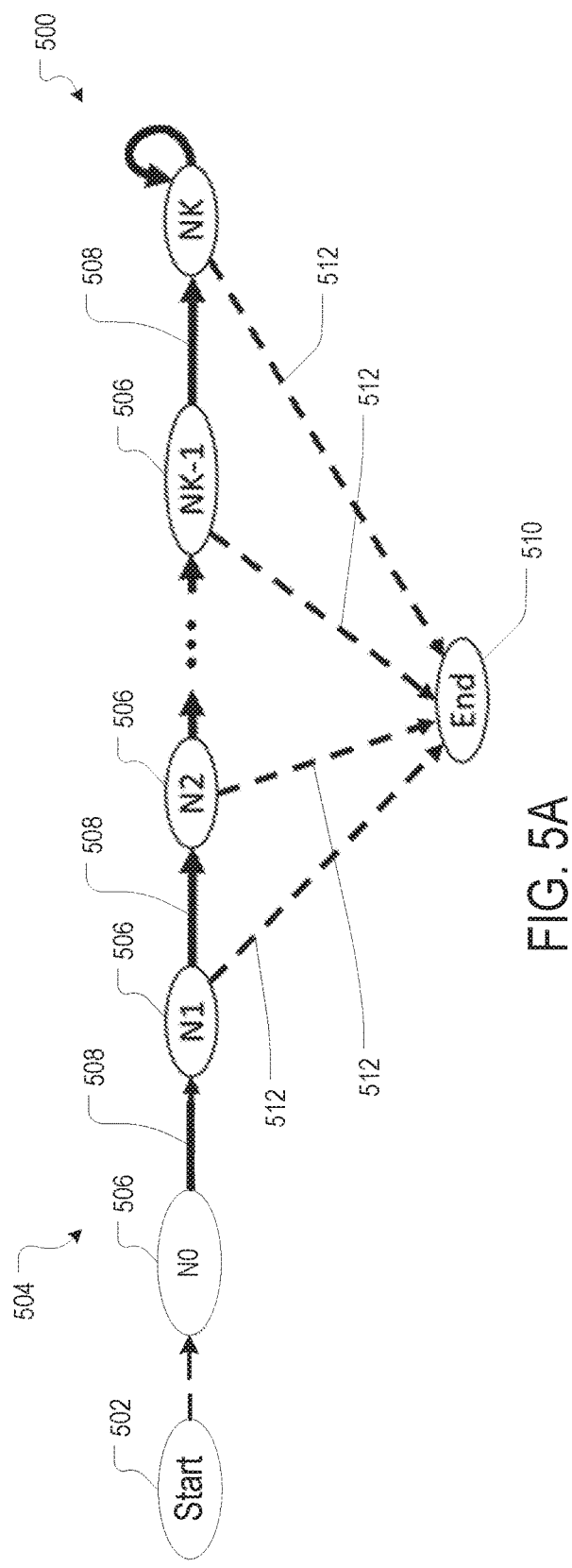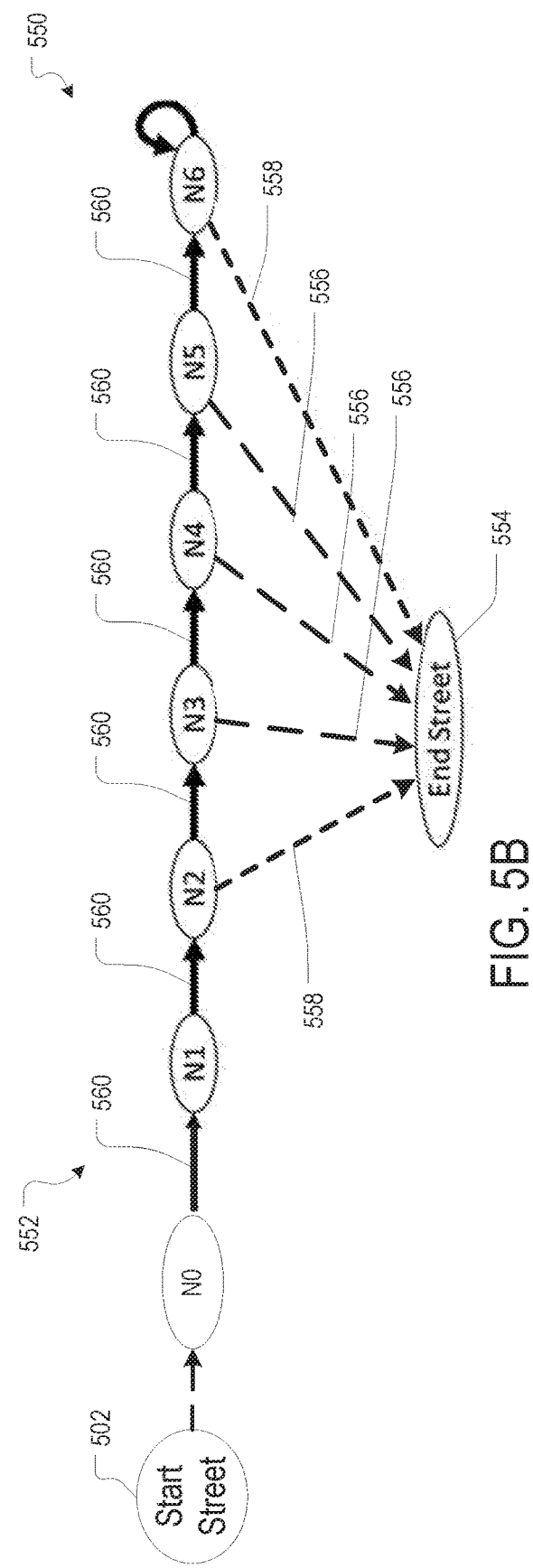
FIG. 5A
FIG. 5B

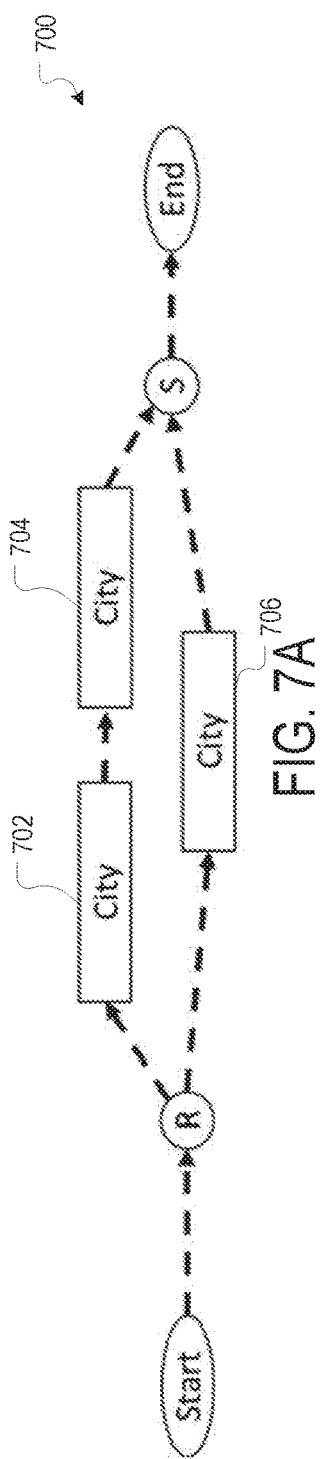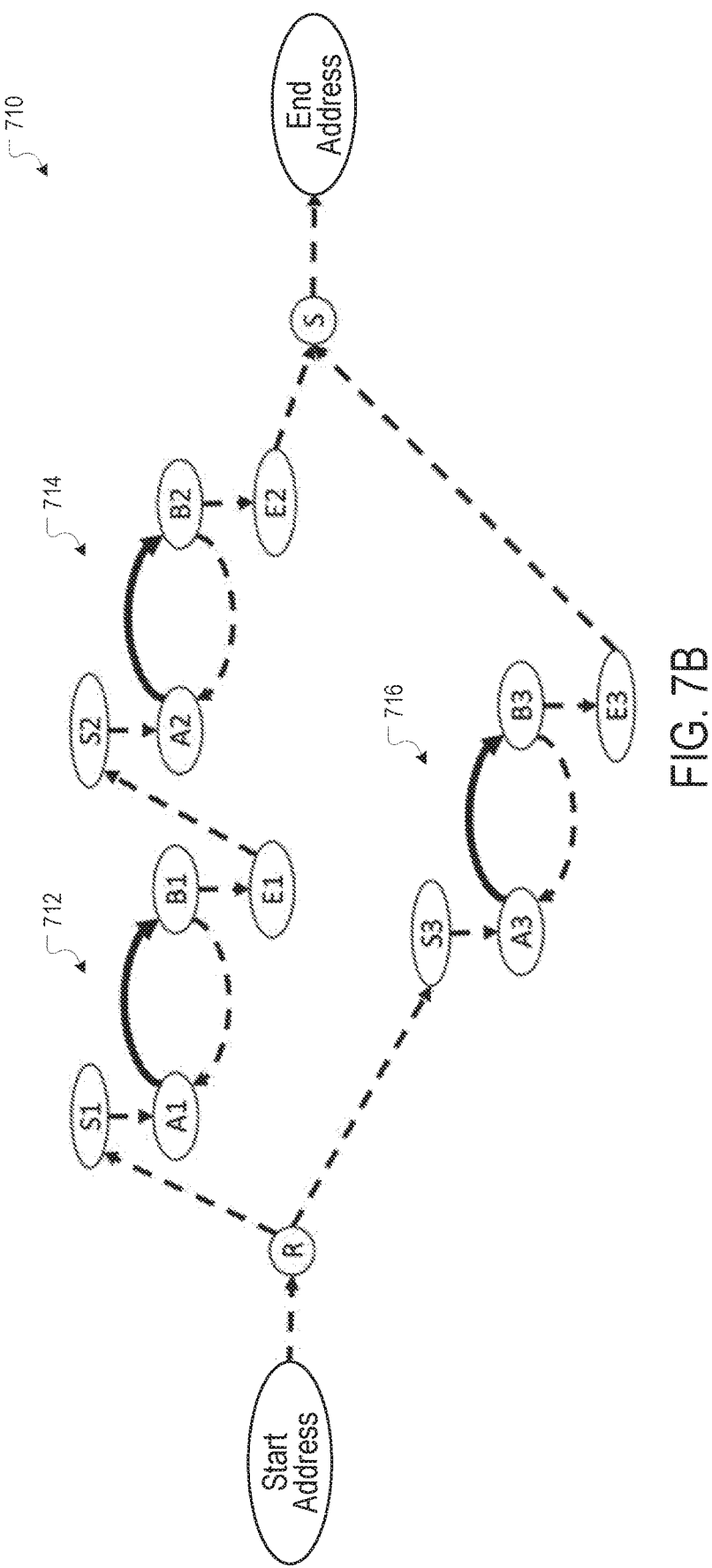
FIG. 7A
FIG. 7B

LEARNING THE STRUCTURE OF HIERARCHICAL EXTRACTION MODELS

BACKGROUND

The abundance of digital information available in the "information age" has prompted much research in the field of computer technologies to be devoted to finding automated ways of discerning meaning from data, especially text or other human-language input. An important class of problems in this area involves the labeling of a sequence of tokens, such as a sequence of words in a text document, in accordance with a hierarchy of labels that identify concepts and sub-concepts in a given semantic domain; this process is herein also referred to as "hierarchical extraction," and a mapping (in the mathematical sense) of the token sequence onto a label assignment to the sequence is called a "hierarchical extraction model." Examples of concepts that may be captured in label hierarchies include, without limitation, addresses (with sub-concepts such as street, city, state, and zip code), date and time (with sub-concepts such as day of the week, day of the month, month, year, etc.), and names (e.g., personal names including sub-concepts such as first name, middle initial, and last name, or company names including sub-concepts such as designators of the legal entity or geographic region). The hierarchy may be thought of as a tree structure with childless leaf nodes and non-leaf nodes that are parents of other nodes.

Given a particular label hierarchy, a hierarchical extraction model can be implemented, in one approach, with a hierarchical state machine (a type of finite state machine) that models the labeling process as "transitions" between "states" of a token sequence and reflects the hierarchical relations in the label hierarchy in the nesting of "sub-concept state machines" representing the various concepts and sub-concepts at the different levels of the hierarchy. The hierarchical state machine can generally be traversed along different paths, which correspond to different possible ways of labeling a token sequence. For a given token sequence of a certain length, the transitions between states may be weighted based on features of the tokens, which allows assigning overall weights to the various paths of the certain length, and searching for the highest-weight path to thereby determine one unique labeling for the token sequence. The functions of the token features used in the weighting, herein also "weight functions," may include parameters that can be adjusted to tune the performance of the hierarchical state machine as a hierarchical extraction model; these parameters are often determined by machine learning as applied to at least partially labeled training data. The structure of the hierarchical state machine may, in principle, be hand-coded, which, however, can be time-consuming and tedious, and depends, for the performance of the state machine, on the coder's understanding of the data and insight into which structural constraints to impose. Alternatively, the structure can be constructed automatically (that is, without human input) from a set of "default sub-concept state machines" that model well-defined steps within the labeling process, such as the labeling of individual tokens, in a generic, hierarchy-agnostic manner. Depending on the complexity of this set of default state machines, the hierarchical state machines built therefrom may suffer from oversimplicity, e.g., in that they fail to capture dependencies inherent in the data, or, on the other end of the spectrum, from excessive complexity, which entails high computational cost, possibly without conveying a commensurate benefit. Accordingly, improved approaches to creating hierarchical state machines for hierarchical extraction are desirable.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed in this summary section is not intended to provide limitation to the elements of the claimed subject matter.

This disclosure relates to hierarchical state machines implementing hierarchical extraction models, and describes an approach to learning the structure of a hierarchical state machine from labeled training data or, more specifically, from statistics about label sequences occurring in the training data. The training data generally includes one or more sequences of tokens labeled in accordance with a given label hierarchy, and any sub-sequence of consecutive tokens (disregarding tokens that do not fit any of the labels within the hierarchy) whose associated labels match a specified sequence of labels constitutes an occurrence of that label sequence in the data. In some embodiments, the statistical distribution of a defined set of label sequences, which corresponds to the numbers of occurrences, in the data, of all respective label sequences belonging to the set, is used to generate a portion of the hierarchical state machine that represents the set of label sequences and reflects the statistical distribution, e.g., in the weighting of transitions.

In one example embodiment, hereinafter also called "frequent-length encoding" for ease of reference, the set of label sequences is the set of sequences of one or more repetitions of a certain specified leaf-node label (e.g., for label "a," the sequences "a," "aa," "aaa," etc.). In the case of frequent-length encoding, the statistical distribution is a distribution of the lengths of the sequences within the set, measured by the number of consecutive tokens to which the specified label is assigned (and which belong to the same instance of the concept identified by the label). (The distribution may be truncated to lump all lengths equal to and beyond a specified maximum tracked length together.) In another example embodiment, hereinafter also called "frequent-sequence encoding" for ease of reference, the set of labels is a set of permutations (with or without repetition) of labels that are children of the same parent label (corresponding to a non-leaf node) in the label hierarchy. In this case, the statistical distribution may measure the (relative) numbers of occurrences of at least the most frequently occurring child-label sequences (possibly lumping the other, less frequently (or non-) occurring sequences together). Since the label sequences coincide, in these example embodiments, with a certain semantic concept or sub-concept, such as the concept identified by the specified label or the concept identified by the common parent of the labels in the label sequence, the corresponding portion of the state machine that represents the set of label sequences is a sub-concept state machine.

Within the sub-concept state machine (or other portion of the state machine representing the set of label sequences), the label sequences, or at least a subset of the more frequent ones of the label sequences, may be represented by one or more non-cyclic directed chains of states, where a "directed chain of states" denotes a set of states linked together into a chain by transitions all going in the same direction along a path from a first state within the chain to a last state within the chain, and where "non-cyclic" indicates that—in contrast to conventional default sub-concept state machines—there are no transitions from a subsequent state in the chain back to a preceding state. (The term "non-cyclic" is not intended to preclude the possibility of a transition linking a state back to itself.) The states in the chain may be simple states or composite states, a "composite state" being a representation of a sub-concept state machine and substitutable by that sub-concept state machine, and a "simple state" being any state that is not a composite state. In accordance with various embodiments, transitions that represent the labeling of individual tokens, herein referred to as "token-consuming" transitions, can connect only two simple states, whereas non-token-consuming transitions, also referred to as "epsilon" transitions, can form connections between both simple and composite states.

In the case of frequent-length encoding for a set of sequences of a specified leaf-node label, the sub-concept state machine may represent all sequences of the set by a single non-cyclic directed chain of states connected by token-consuming transitions (corresponding to labeling the respective token with the leaf-node label, and equal in number to the maximum tracked length or a smaller maximum length selected based on the statistical distribution), with epsilon transitions connecting various states in the chain directly to an end state of the sub-concept state machine. In frequent-sequence encoding, the sub-concept state machine for the set of child-label sequences of a given non-leaf-node label may represent the most frequent child-label sequence(s) by separate respective non-cyclic directed chains of composite states, and provide a parallel alternative (or "default") (sub-)path through the sub-concept state machine for all other possible child-label sequences. Whatever the structure of the sub-concept state machine, the statistical distribution of the respective set of label sequences may be reflected in different weight functions (e.g., differing in the values of the adjustable parameters) assigned to the transitions along different sub-paths corresponding to the various label sequences. For instance, in frequent-length encoding, the epsilon transitions from states in the chain to the end state may be grouped based on the lengths of the resulting sub-paths through the state machine to distinguish between a group of high-frequency label sequences and a group of lower-frequency label sequences, with different weight functions being assigned to the different respective groups. In frequent-sequence encoding, transitions to or from the chain(s) representing the frequent child-label sequence(s) may be weighted differently than transitions to the default path.

The above-described method for generating the structure of a hierarchical state machine to implement a hierarchical extraction model can be automated with software executed by the hardware processor(s) of a computing system. A software tool implementing an extraction-model generator may be integrated, in accordance with some embodiments, into a larger platform for building, training, and testing hierarchical state machines, which may also include, e.g., a statistics component for deriving the statistical distributions of certain defined sets of label sequences from training data, a training component that may use machine learning to compute the adjustable parameters of the weight functions and/or allow token features to be tested interactively for their suitability as variables of the weight function, and a search component for ascertaining the highest-weight path through a weighted state machine aligned with a sequence of tokens, e.g., to facilitate labeling test sequences. The platform may also allow the structure of (a trained or untrained) hierarchical state machine to be exported, e.g., to a text or image file that allows a human developer to view and study the structure of the state machine, e.g., for debugging purposes, or that can be provided as input to separate software tools further utilizing the state machine (where a text file may help avoid backward-compatibility issues that can sometimes occur when the hierarchical state machine is stored to a binary file).

Beneficially, leveraging statistics in training data, such as the length distribution for sequences of a leaf-node label or the distribution of various non-leaf-node child-label sequences, in accordance herewith allows the hierarchical state machine to directly encode important long-term dependencies in the data, without adding unnecessary complexity to the state machine.

BRIEF DESCRIPTION OF THE DRAWINGS

The foregoing will be more readily understood from the following detailed description of various embodiments, in particular, when taken in conjunction with the accompanying drawings.

FIG. 1A shows an example token sequence.

FIG. 1B depicts a tree structure for an example label hierarchy.

FIG. 1C shows the example token sequence of FIG. 1A as labeled in accordance with the label hierarchy of FIG. 1B.

FIG. 5A is a diagram of the structure of an example leaf-node state machine, in accordance with various embodiments, for encoding a statistical distribution of the length of labeled segments.

FIG. 5B is a diagram of an example implementation of the state machine of FIG. 5A for the "Street" label, in accordance with one embodiment.

FIG. 7A is a diagram of an example state machine that includes two chains for the frequent sequences of child labels, in accordance with one embodiment.

FIG. 7B is a diagram of the example state machine of FIG. 7A as expanded using the example state machine of FIG. 2A, in accordance with one embodiment.

DETAILED DESCRIPTION

Figure 2A:
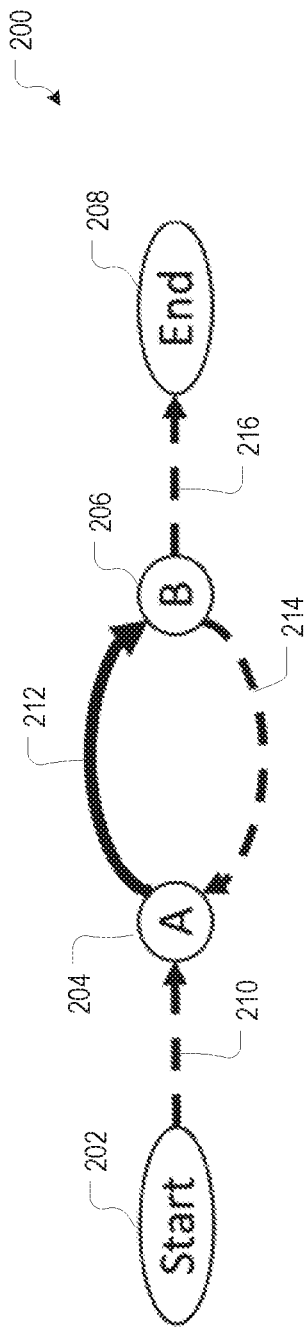
FIG. 2A is a diagram of an example state machine for a leaf node in a label hierarchy.

Various embodiments of methods, systems, and software (as stored on one or more computer-readable media) for generating hierarchical state machines implementing a hierarchical extraction model for a label hierarchy are hereinafter described, for purposes of illustration, with reference to a simple example label hierarchy for addresses. It will be evident to those of ordinary skill in the art given the benefit of the present disclosure how to apply the principles discussed in this disclosure to other (including more complex) label hierarchies as well as to data other than human-language text. In general, the approach discussed herein is applicable to any type of data amenable to hierarchical labeling that features some type of sequential statistics. Such data may include, for example and without limitation, text documents or other sequences of symbols (e.g., sheet music, where different parts of a score may be labeled), voice or other sound recordings (e.g., voice commands that may be analyzed by a computing system to ascertain their meaning), numerical data streams (which may be labeled, e.g., to determine hierarchical patterns in the data), and sequences of image data (e.g., videos, which may be labeled to identify certain segments).

With reference to FIGS. 1A-1C, to provide a simple example of hierarchical extraction, the labeling of addresses occurring in a text document (that is, a token sequence consisting of words, numbers, and punctuation marks) is illustrated. FIG. 1A shows an example span of tokens (or "token sub-sequence") 100 corresponding to an excerpt of a text document. FIG. 1B illustrates, in the form of a tree structure, a simple two-level label hierarchy 110 including a root (non-leaf) node 114 for an "Address" label and, as children of the "Address" node, four leaf nodes 116, 117, 118, 119 for "Street," "City," "State," and "Zip" labels, respectively. An address-extraction model in accordance with the label hierarchy 110 may result in the label assignment to the span of tokens 100 that is depicted in FIG. 1C. Herein, the span of tokens 120, "6552 Bolsa Ave, Suite H Huntington Beach, Calif. 92647," is labeled as an address, with child labels for the street, city, state, and zip being assigned to the (sub-)spans 122 ("6552 Bolsa Ave, Suite H"), 124 ("Huntington Beach"), 126 ("CA"), 128 ("92647"). As can be seen, the leaf-node labels may each span one or more tokens in the sub-sequence 100. Note that the comma between "Huntington Beach" and "CA" is labeled, in this embodiment, as part of an address but not as any of the four child labels in the hierarchy. It is possible, in an alternative embodiment, to add another leaf node to the tree structure 110 as a child of the "Address" node 114 to capture all tokens underneath the address that are considered "junk" in that they do not fall within any of the other four leaf-node labels. Note further that the span "Orange County Drug Testing" is implicitly labeled "Not Address" (by virtue of not being labeled "Address").

For a label hierarchy consisting of a set of label nodes $\{h_1, \ldots, h_z\}$, a hierarchical extraction model maps a sequence of tokens $D=\{t_1, \ldots, t_m\}$ onto a label assignment to the sequence that specifies, for each token, which ones of the label nodes $h_j$ apply to the token (where multiple labels that are in a parent-child relationship may apply to the same token). The label assignment may also take account of "segment cuts" between two adjacent segments of tokens that have the same associated label, but belong to different instances of the concept identified by that label. The label assignment may be formally represented, for example, by a token-label vector $O=\{o_1, \ldots, o_m\}$ whose elements $o_i=\{o_{i1}, \ldots, o_{iz}\}$ are binary vectors indicating, for each node $h_j$ in the label hierarchy, whether that label applies to the token $t_i$ (or, put differently, whether the token $t_i$ is contained within a segment having that label), in conjunction with a transition-label vector $R=\{r_1, \ldots, r_{m+1}\}$ whose elements $r_i=\{r_{i,1}, \ldots, r_{i,z}\}$ are binary vectors indicating, for each pair of adjacent tokens $(t_{i-1}, t_i)$, whether they are contained within the same segment with that label. With this notation, the hierarchical extraction model M is a mapping from the token sequence onto the token-label and transition-label vectors:

$$\{t_1, \ldots, t_m\} \stackrel{M}{\to} \{O, R\}.$$

A hierarchical state machine reflecting the label hierarchy can implement the hierarchical extraction model M in the sense that each path through the state machine that includes exactly m token-consuming transitions prescribes a particular label assignment to the token sequence (e.g., produces label vectors $\{O, R\}$), corresponding to a particular mapping M.

With reference to FIGS. 2A-2D, the construction of a conventional example state machine for the label hierarchy 110 of FIG. 1A is illustrated. In general, constructing the state machine involves recursively defining, for each node $h_j$ in the label hierarchy, one or more sub-concept finite state machines $\{M_j\}$ that annotate token sequences with labels from the sub-hierarchy rooted at $h_j$. These sub-concept state machines are then combined to define the hierarchical state machine.

FIG. 2A shows an example standard state machine 200 as may be used for any leaf node in a label hierarchy. The leaf-node state machine 200 consists of four simple states 202, 204, 206, 208 (including a start state 202 and an end state 208), and transitions 210, 212, 214, 216 therebetween. In general, each transition in a state machine is either a token-consuming transition, meaning that it labels the current token and then advances to the next token in the sequence, or else an epsilon transition. Token-consuming transitions are herein denoted by solid lines, and epsilon transitions are denoted by dashed lines. Returning to the description of FIG. 2A, the leaf-node state machine 200 includes only one token-consuming transition 212 from state A (204) to state B (206). To allow for multiple tokens under the same label, epsilon transition 214 goes from state B (206) back to state A (204). (Note that, by leaving the state machine 200 at the end state 208 and immediately returning (via an epsilon transition outside the state machine) to the start state 202, the same label can be applied to adjacent tokens belonging to different segments.) If this leaf-node state machine 200 is used, for instance, for the label "Street" in the example of FIGS. 1A-1B, and if the current token index is 5 ("6552"), then the path Start→A→B→A→B→A→B→A→B→
A→B→A→B→End will label tokens 5 through 10 with "Street," leaving the state machine at token index 11 when it reaches the end state 208. Note that this state state machine, due to the inclusion of the epsilon transition 214, "accepts" streets of arbitrary length, meaning that, for any k, there exists a path consisting of k token-consuming transitions from the start state 202 to the end state 208. By contrast, if the transition 214 from state B (206) to state A (204) were removed, the state machine 200 would label only streets with a single token. Importantly, the structure of the leaf-node state machines in a hierarchical state machine may be subject to the constraints that every path from the start state to the end state of the leaf-node state machine passes through at least one token-consuming transition, and that the leaf-node state machine contains no directed cycles containing only epsilon transitions (which would allow the label processing to get "stuck" at a given token index).

Figure 2B:
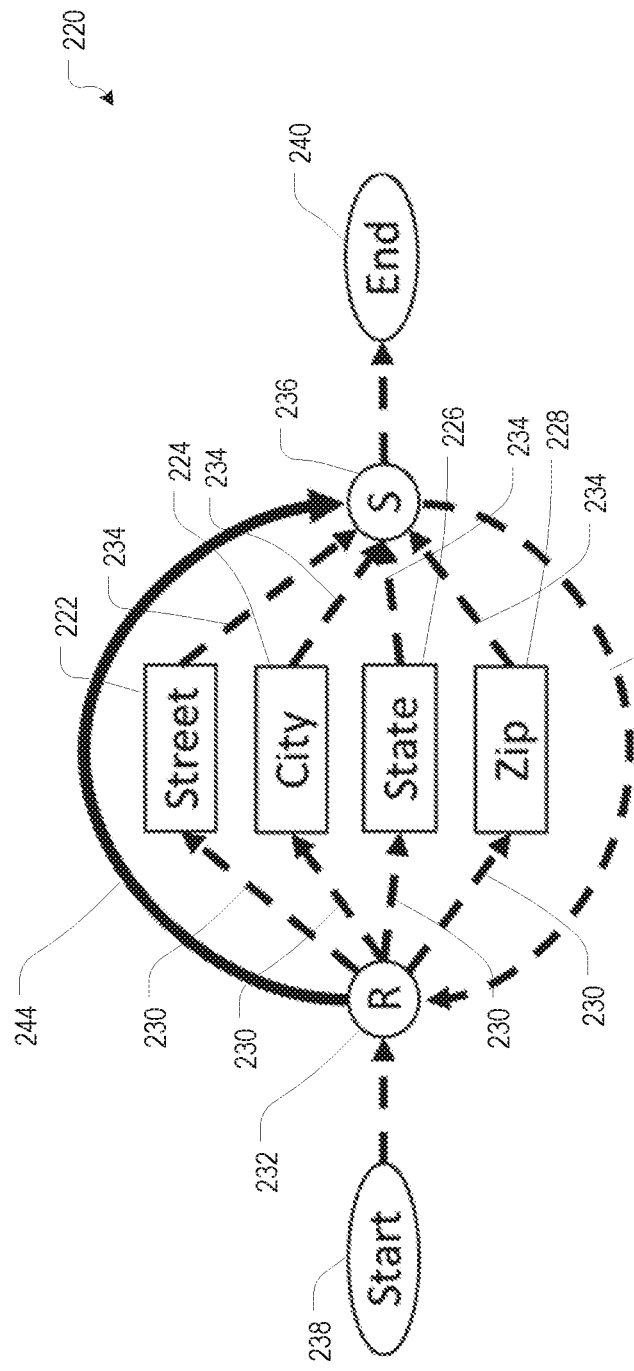
FIG. 2B is a diagram of an example state machine for a non-leaf node in a label hierarchy.

FIG. 2B shows an example state machine 220 for a non-leaf node in the label hierarchy 110. State machines for non-leaf nodes generally include special composite states that represent child state machines (herein indicated by rectangles, to distinguish from the simple states depicted as ellipses), where each composite state has exactly one incoming transition and one out-going transition that corresponds to starting and ending a sub-segment, respectively. The example state machine 220 represents the "Address" non-leaf node 114, and includes four composite states 222, 224, 226, 228 for the child nodes 116 ("Street"), 117 ("City"), 118 ("State"), 119 ("Zip"), respectively. The incoming transitions 230 of these composite state machines 222, 224, 226, 228 originate at a common state R (232), and the outgoing transitions 234 end at a common destination state S (236); the states R and S are, in turn, connected to a start state 238 and an end state 240, respectively. An epsilon transition 242 from state S (236) back to state R (232) allows the state machine 220 to pass through a sequence of the composite state machines 222, 224, 226, 228 in labeling the parts of an address. Further, the single token-consuming transition 244 from state S (236) to state R (232) allows for a token to be labeled as an address without assigning a child-node label of "Address." The structure of state machines for non-leaf nodes may be subject to the constraint that every path from the start state (e.g., state 238) to the end state (e.g., state 240) passes through at least one of (1) a token-consuming edge or (2) a composite state. Intuitively, this constraint means that any path that reaches the start state of a state machine $\{M_j\}$ for label $h_j$ labels a segment including at least one token with the label $h_j$. The non-leaf-node state machine may be further constrained, in its structure, to include no directed cycles of epsilon transitions between the states that do not pass through a composite state. (Directed cycles of epsilon edges that pass through a composite state are allowable because any path through the composite state will include a token-consuming transition.)

Figure 2C:
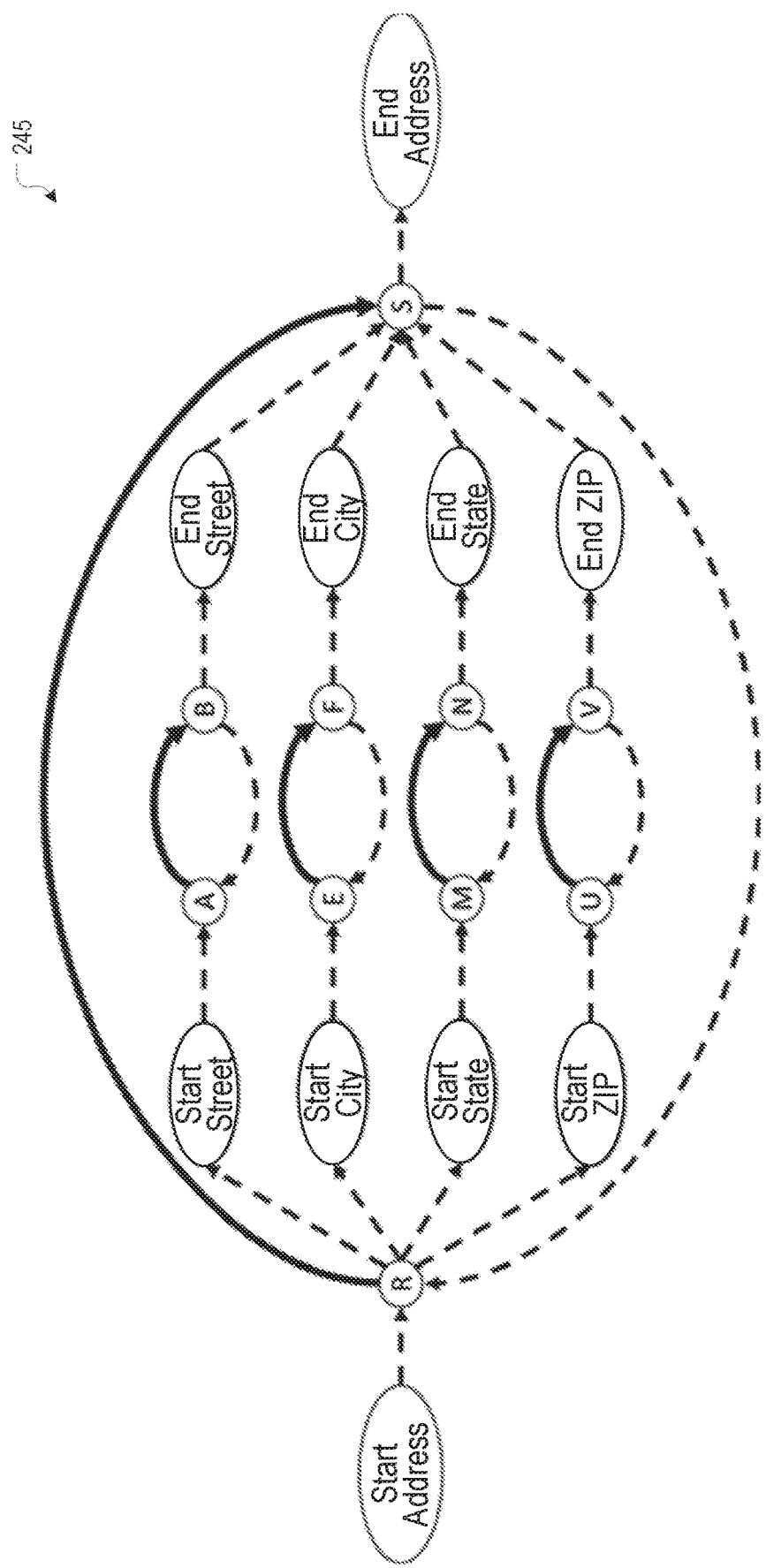
FIG. 2C is a diagram of the example state machine of FIG. 2B as expanded using the example state machine of FIG. 2A.

A non-leaf-node state machine can be expanded into a "normal" state machine including only simple states and transitions therebetween by recursively replacing each composite state with the child state machine it represents. FIG. 2C provides an example of such an expanded state machine 245 for the non-leaf-node state machine 220 for "Address," using the structure of the leaf-node state machine 200 for all composite states.

Figure 2D:
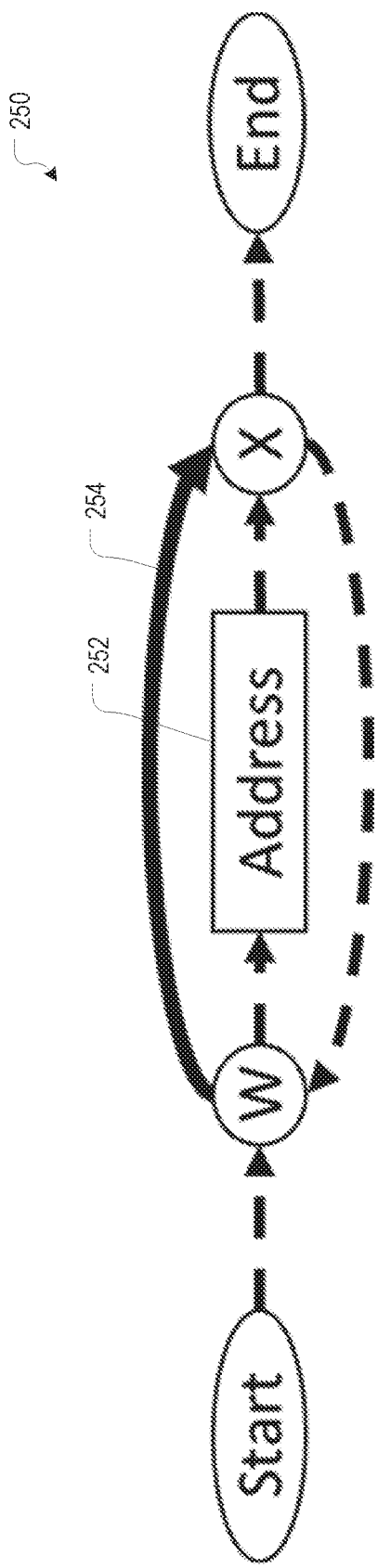
FIG. 2D is a diagram of an example hierarchical state machine constructed from the leaf-node and non-leaf-node state machines of FIGS. 2A and 2B.

FIG. 2D shows an example hierarchical state machine 250 for labeling a document in its entirety. This document-level state machine 250 can transition into a composite state 252 corresponding to the root of the label hierarchy, which, in the above example, is the "Address" node 114. The token-consuming transition 254 in the document-level state machine 250, being a transition outside the composite state 252 for the "Address" label, corresponds to labeling a token implicitly as "Non-Address" (e.g., as represented by a token-label vector whose elements are all zero). Note that, in order to label documents based on multiple label hierarchies that are mutually exclusive (e.g., label hierarchies for addresses and phone numbers), state machines for both of the label hierarchies can be included in the document-level state machine. For simplicity and clarity, the examples illustrated in this disclosure include only a single hierarchy.

As indicated previously, a path through a state machine corresponds to a particular labeling of a sequence of tokens. To state this relation more formally, given a document containing m tokens, let π denote any path through a hierarchical state machine that starts at the document-level start node, traverses exactly m token-consuming edges, and ends at the document-level end node; π may be called a "parse" of the document. Further, for a sub-concept state machine M, let h(M) denote the label-hierarchy node corresponding to M, and let $h_0$ denote the implicit label node corresponding to the document-level state machine. A state machine $M_d$ is called a "descendant" of state machine M if $h(M_d)$ is a descendant (e.g., a child, grandchild, etc.) of h(M) in the label hierarchy. In the address example, the "Address" state machine is a descendant of the "Document" state machine, and the "Street," "City," "State," and "Zip" state machines are all descendants of both the "Address" machine and the "Document" machine.

Let $\pi_i$ denote the i-th token-consuming transitions from parse π, and let $M(\pi_i)$ denote the sub-concept state machine that contains that transition. In the address example, using the state labels of FIGS. 2C and 2D, the parse of the document corresponding to the hierarchical extraction for the token span 100 of FIG. 1A is:

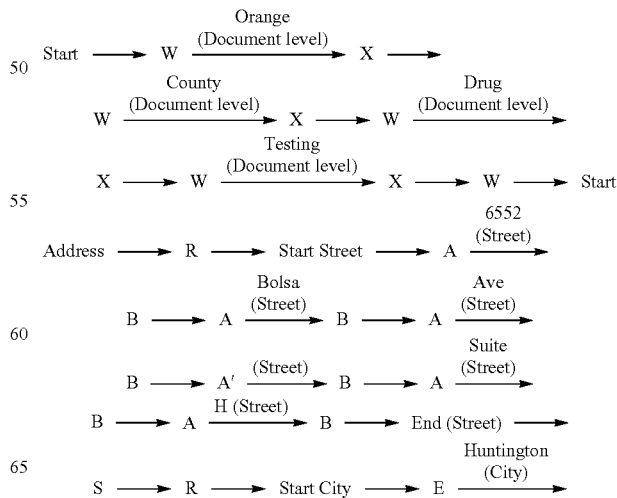

-continued

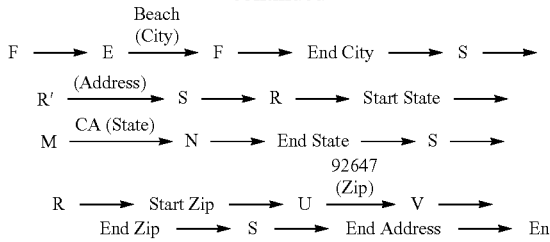

Herein, above each token-consuming transition $\pi_i$, the token being consumed is shown, followed by label-hierarchy node $h(M(\pi_i))$ in parentheses. Let $\pi_{i,k}$ denote the sub-path of $\pi$ that starts with $\pi_i$, follows $\pi$ as it consumes token i through token k, and ends with $\pi_k$. From the example parse above, $\pi_{5,7}$ is the sub-path that consumes the tokens "6552", "Bolsa" and "Ave":

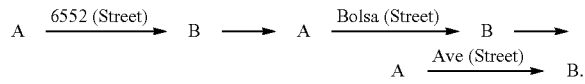

A sub-path $\pi_{i,k}$ is called "underneath" a sub-concept state machine M if every transition in $\pi_{i,k}$ is contained within M or a descendent of M. Thus, for example, $\pi_{5,7}$ is underneath the "Address" state machine and the "Street" state machine, whereas $\pi_{4,7}$ is only underneath the "Document" state machine. Intuitively, when following the path through the state machine, whenever the path goes through a token-consuming transition, the current token is labeled with the hierarchy node corresponding to the current sub-state machine, as well as, by implication from the "part of" hierarchy, with all ancestor nodes.

To discriminate between the generally multiple paths through a document-level state machine that have exactly m token-consuming transitions and, for instance, determine a unique path for labeling the document (or assess the probabilities with which the various paths produce the correct label assignment), the state machine may be weighted. More specifically, in a weighted hierarchical state machine, the transitions are annotated with weight functions that depend on various features of the tokens; given these weights, a search algorithm can be applied to identify the highest-weight parse for the document. The weight functions themselves can be learned from training data, using machine-learning algorithms.

As a prerequisite to evaluating the weight functions for a given token sequence and, ultimately, labeling the tokens, the token-consuming transitions of the state machine are aligned with the tokens, rendering the token-consuming transitions index-specific. The prohibition of directed cycles of epsilon edges within any of the sub-concept state machines, taken in conjunction with the ability to expand non-leaf-node state machines into "normal" state machines by recursively replacing the composite states with the state machines they represent, facilitates achieving such alignment by "rolling out" the state machine over the tokens in a document into an acyclic graph. Because there are no directed cycles of epsilon transitions, any path of epsilon transitions between two token-consuming edges must be finite. As a result, the token-consuming edges can be aligned, index-specifically, with the tokens in the document, and the finite graph of epsilon transitions that connect them can be replicated between each pair of tokens.

Figure 3A:
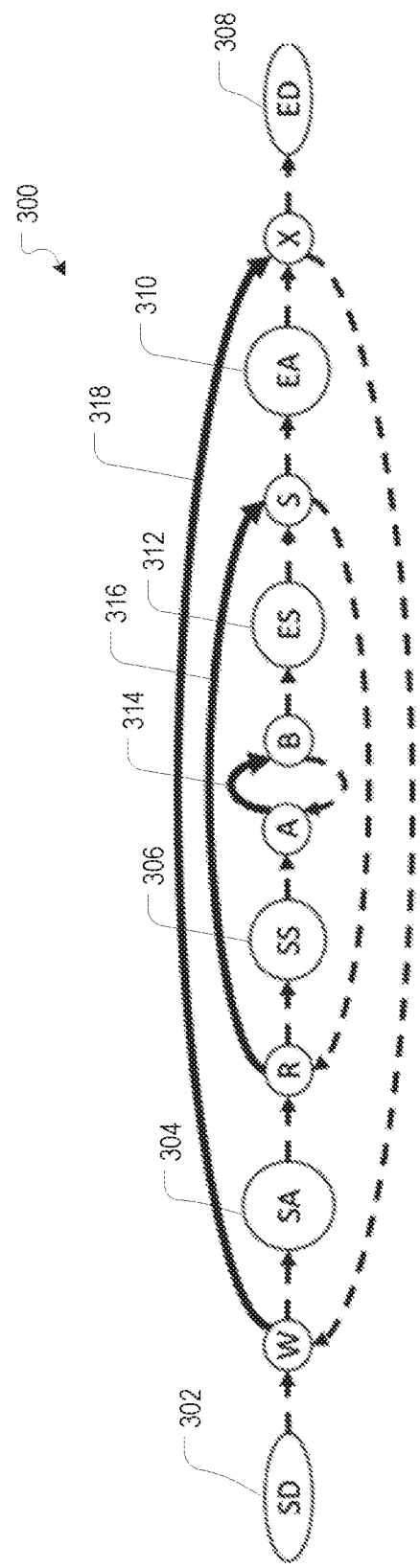
FIG. 3A is a diagram of an expanded hierarchical state machine for address extraction.
Figure 3B:
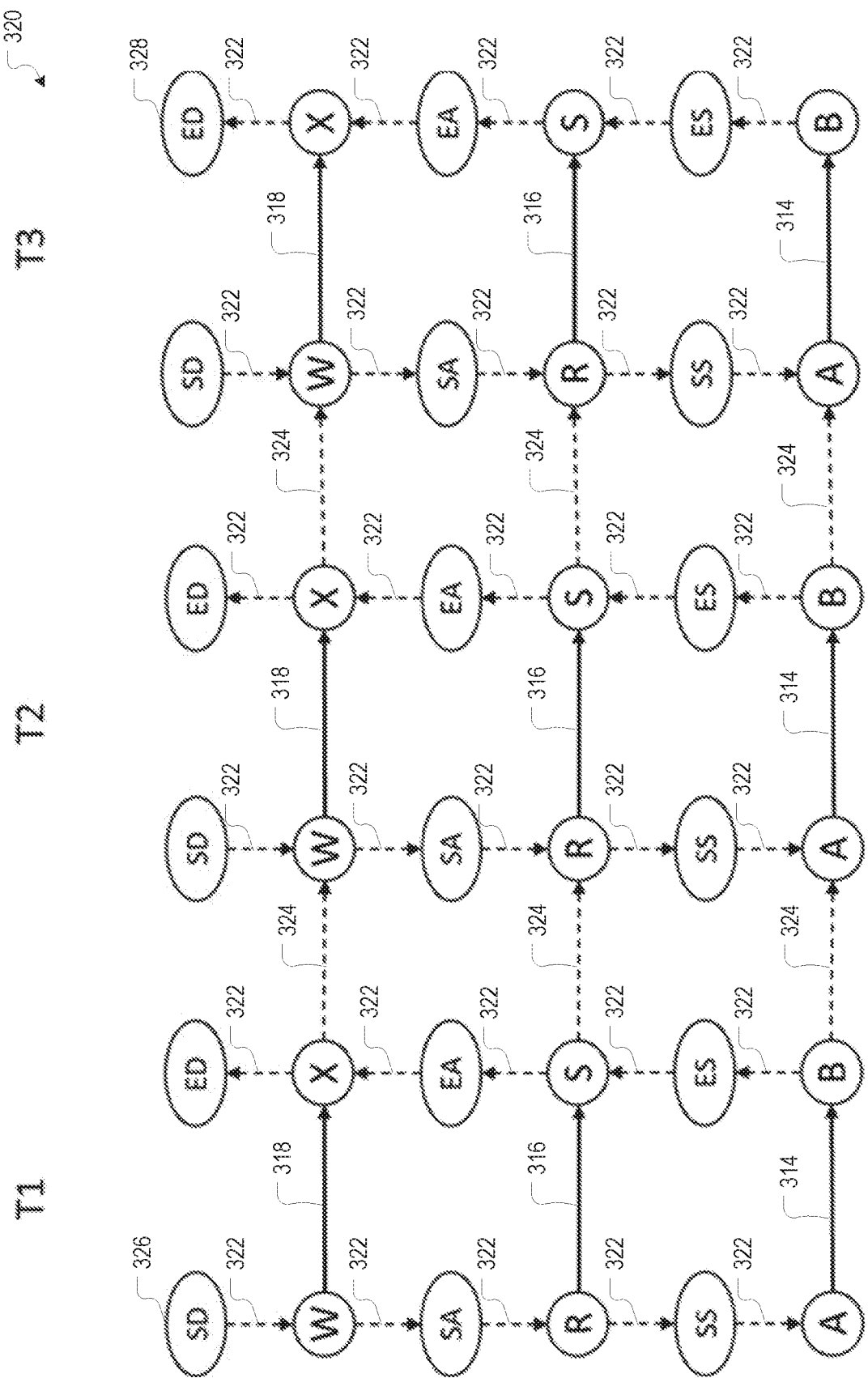
FIG. 3B is a diagram of a trellis structure in which the expanded hierarchical state machine of FIG. 3A is aligned with a three-token document.

FIGS. 3A and 3B illustrate the alignment of a state machine with a sequence of tokens. Shown in FIG. 3A is an expanded view of a state machine 300 for address extraction, simplified to distinguish, at the hierarchy level underneath the address label, only between street segments and non-street segments. In the figure, the start states 302, 304, 306 for the document-level state machine, the "Address" state machine, and the "Street" state machine, respectively, are labeled "SD", "SA," and "SS." Similarly, the end states 308, 310, 312 are labeled "ED," "EA," and "ES." The simplified state machine 300 includes three token-consuming transitions 314 (A→B), 316 (R→S), 318 (W→X) for labeling a token as "Address" as well as "Street," "Address" only, and "Non-Address," respectively.

FIG. 3B shows the state machine 300 rolled out for a three-token document to form a trellis structure 320. As can be seen, in the trellis structure 320, each of the three token-consuming edges 314, 316, 318 is aligned with each of the three tokens T1, T2, T3 in three respective copies of the state machine 300. The epsilon transitions 322 within a directed path from the start state to the end state are included between the states aligned with a single token, whereas epsilon transitions 324 that return to a preceding state are included between pairs of states aligned with two adjacent tokens. With this view, parses of the document correspond to directed paths in the trellis structure 320 from the SD state 326 preceding token T1 to the ED state 328 following token T3.

Returning to the discussion of weighting, suppose that each of the tokens in the document has a fixed-dimensional vector of scalar-valued token features. Examples of token features include the data type of the token (e.g., whether the token is a word, number, or punctuation mark) and a grammatic classification of the token or probability therefor (e.g., whether the token is a verb). Given such a feature vector for each token, a context-specific weight function can be assigned to some or all of the transitions in the hierarchical state machine. Then, for any given document, the rolled-out trellis structure includes weighed transitions, and a search algorithm can be applied to identify the highest-weight path. The well-known Viterbi algorithm is commonly used for this purpose, but other suitable algorithms may occur to those of ordinary skill in the art. The weight of a path may be defined as either the sum or the product of the weights of the transitions in the path. Algorithms that compute sums (products) can be used to compute products (sums) simply by taking the logarithm of (exponentiating) the transition weights, and then exponentiating (taking the logarithm of) the result. An unweighted transition can be implemented using a weight function equal to constant zero (in the case of sum) or constant one (in the case of product), in which case the transition contributes nothing to the path weight.

The weight functions may, in general, be any function of token features. Commonly, transitions are weighted with linear weight functions that depend on one or more token features within some fixed window of the token aligned with the respective transition. Suppose, for example, that each token t has d scalar-valued feature values $F_{1t} \ldots F_{dt}$, and that a window of plus or minus t tokens is used for each transition. (The window need not be symmetric around the token, and need not be the same for each transition.) Then, the weight function $W_{et}$ for the e-th transition (or "edge") in the state machine corresponding to token t in the document may be expressed as:

$$W_{et} = C_e + \Sigma_{p=-q}^{q} \Sigma_{i=1}^{d} (F_{i(t+p)} \times \theta_{ip}),$$

where $C_e$ and $\theta_{ip}$ denote adjustable parameters that may be learned from data. To provide a specific example, consider the transition X→W between tokens T1 and T2 in the example of FIG. 3B, and suppose that each token has two features and a window size of one is used. Assuming the edge has index e within the state machine, and because the next token is 2, the weight function for this transition is:

$$W_{e2} = C_e + \sum_{p=-1}^{1} \sum_{i=1}^{2} (F_{i(2+p)} \times \theta_{ip})$$
$$= C_e + F_{11} \times \theta_{1,-1} + F_{21} \times \theta_{2,-1} + F_{12} \times \theta_{1,0} + F_{22} \times \theta_{2,0} + F_{13} \times \theta_{1,1} + F_{23} \times \theta_{2,1}$$

Note that each weight function has 1+(2p+1)d parameters: the single constant $C_e$, and a parameter $\theta_{ip}$ for each feature/window-offset combination. Not all transitions in the state machine need be weighted, and weighted transitions can share weight functions as well as parameter values. Thus, the number of parameters to be learned can vary significantly for the same state machine. Sharing weight functions and/or parameters across transitions may serve to reduce the computational expense of training the weights.

Given the structure of a hierarchical state machine, the weight functions for the transitions can be learned from training data using standard approaches in machine learning. In a supervised learning scenario, for instance, a set of N labeled documents, $\{D_l, \{O_l, R_l\}\}_{l=1}^{N}$, and a loss function F are used to measure how well label predictions obtained by the state machine match the labeled data. The goal is then to identify the parameter values that yield the lowest loss on the training data. More specifically, as is known to those of ordinary skill in the art, the state machine can be applied to the token sequences in the training data to determine predicted labels, whose discrepancy from the actual labels is quantified with the loss function. The parameters of the weight functions can be iteratively adjusted to minimize the loss function. The loss function may have regularization built in to prevent over-fitting to the training data.

In some embodiments, the prediction obtained by the state machine is probabilistic, meaning that it does not merely identify the highest-weight parse of the document (i.e., the highest-weight path through the state machine that has exactly m token-consuming transitions, where m is the length of the document), but that it can assign a probability value to any given parse. Different models for converting path weights to probabilities exist, a popular one being the conditional random field (CRF), which models the probability of a parse as a value proportional to the product of the transition weights. Efficient algorithms exist for optimizing the parameters of the weight function when using, for instance, a logarithmic loss function in conjunction with a CRF. The CRF approach is also beneficial in that it allows great flexibility in the types of training data that can be used. For any training example (i.e., any document $D_l$ and associated labels $\{O_l, R_l\}$ in the training data), the labels can be unspecified, or missing, for any subset of the atomic values, without affecting the ability of the training algorithm to find the globally optimal solution. For example, a training example could specify that token 5 is an address, that tokens 10 and 11 are not part of the same street, and nothing else. As another example, the approach can use training data where per-document labels are restricted to a single label node in the hierarchy; a hierarchical extractor model for the full hierarchy can be learned from documents that are each labeled with the "in" and "out" sequences for only a single node in the hierarchy. Furthermore, with a CRF, it is easy to share the weight functions among transitions (examples of such sharing are given below with respect to FIGS. 5A-6B. At a high level, the CRF is able to efficiently compute the derivative of the logarithmic loss function with respect to each of the at least partially labeled documents in the training set. Because logarithmic loss is convex, following its gradient to a local minimum yields a global optimum. Second-order methods that use the Hessian may be used to speed up convergence.

Figure 4A:
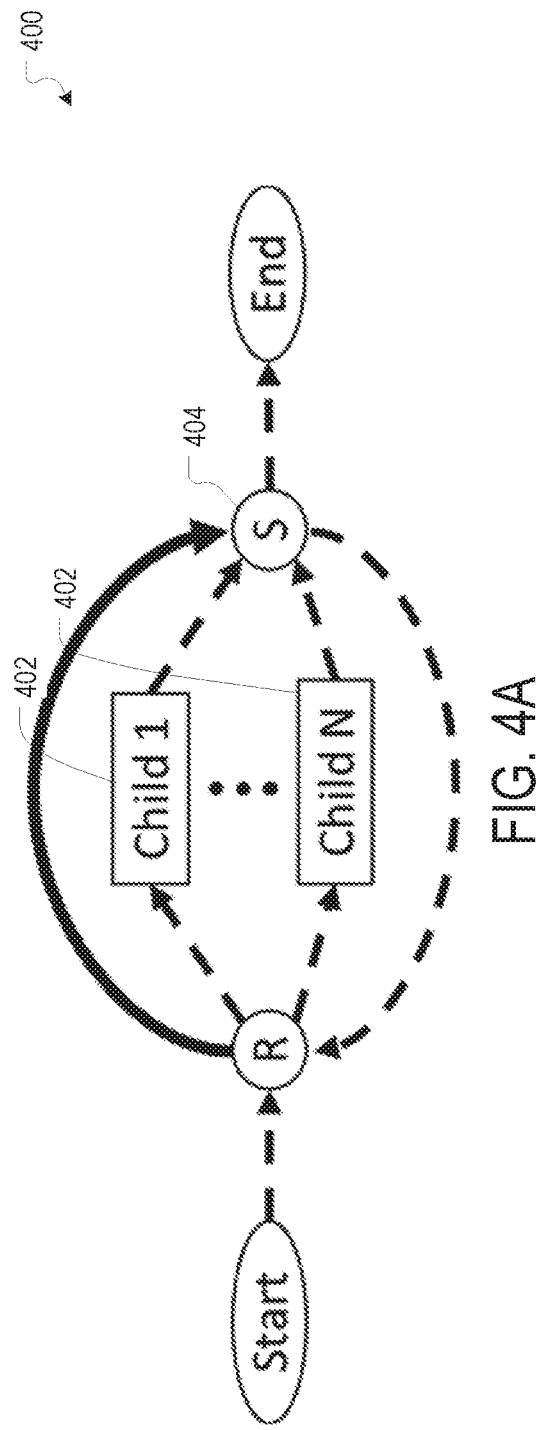
FIG. 4A is a diagram of an example non-leaf-node state machine including multiple parallel paths for multiple respective child state machines all transitioning to a common state.

To create a hierarchical extraction model for a given label hierarchy, the structure of the state machine and parameterized weight functions associated with the transitions may be manually specified. As an alternative to hand-coding the state machine by a person, the state machine can also be constructed automatically from a set of default state machines for various types of nodes. A "default state machine" is herein understood to be a state machine whose structure is static in that it is defined independently from the label hierarchy and from any data. For example, every leaf node in a label hierarchy may be represented, for instance, by the default state machine shown in FIG. 2A, e.g., with weight functions for the transitions 212, 216 (A→B and B→A) that depend on some fixed-size (and possibly tunable) window. FIG. 2C shows this generic structure as applied to each of the four leaf nodes 116, 117, 118, 119 in the address label hierarchy. Further, every non-leaf node may be represented, for instance, by the default state machine 400 depicted in FIG. 4A, with FIG. 2B illustrating the application of this generic structure to the address node 114.

Figure 4B:
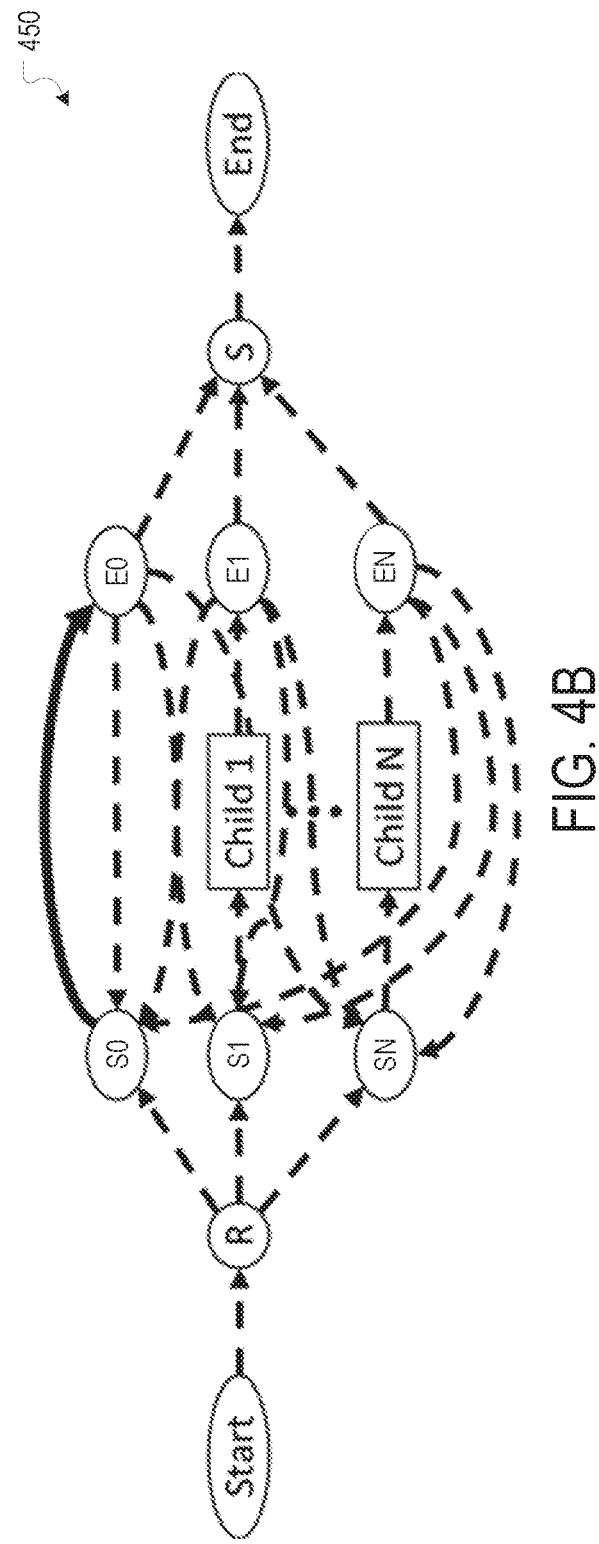
FIG. 4B is a diagram of an example non-leaf-node state machine including pairwise transitions between multiple child state machines.

Note that the state machines 200, 400 do not structurally encode any constraints on the length of labels or order with which the labels can occur, or distinguish between likely and unlikely sequences. The leaf-node state machine 200, for example, allows for an arbitrary number of tokens underneath the label, the probability of exiting the state machine 200 being computed from the same weight function after all token-consuming transitions. Similarly, the non-leaf-node state machine 400, where all child state machines (that is, composite states 402) transition to a single state 404, has no way of encoding constraints such as "Child 2 never comes after Child 4." Both state machines 200, 400, therefore, rely solely on the feature values to encode these constraints. In order to discriminate, with the weight functions themselves (rather than the numbers they evaluate to based on the token features), between different sub-sequences within a non-leaf-node state machine, the state machine 400 may be modified to include separate weighted pairwise transitions between the child state machines, as shown in FIG. 4B for state machine 450. Given a set of default sub-concept state machines that includes multiple candidate default state machines for one or more nodes in the hierarchy (e.g., state machines 400, 450 for a non-leaf-node state machine), hierarchical extraction models can be built by enumerating over combinations of the default sub-concept state machines, training the resulting document-level state machines, and then measuring how well they worked. As will be readily appreciated, however, this approach is computationally expensive, and state machines designed to encode long-term dependencies will become very complex.

Falling back on hand-coding the state machine by a person to optimize its structure is tedious, and in any case, the person may not know what the best constraints to include are.

In accordance with various embodiments, state machines are constructed to encode, by their structure and weight functions, sequential statistics ascertained from training data. More specifically, these state machines include sub-concept state machines that include one or more non-cyclic directed chains of simple or composite states representing specified label sequences found in the data, such as, for instance, sequences of multiple repetitions of a single label (corresponding to segments of multiple tokens with the same label), or sequences of child labels of a common parent label in the hierarchy. Transitions within these sub-concept state machines may be weighted based on a statistical distribution of the label sequences found in the data. For example, chains for more frequent label sequences and chains for less frequent label sequences may be weighted separately, allowing the frequent label sequences to receive higher weights even in the absence of different feature values. FIGS. 5A-6B illustrate two examples of state machines in accordance with these embodiments.

FIG. 5A shows the structure of an example leaf-node state machine 500, in accordance with one embodiment, that can encode a statistical distribution of the length of segments labeled by a specified leaf-node label (or, for short, the length of the specified label), measured as the number of consecutive tokens within a token sequence that form the labeled segment. For any given leaf node, a histogram (or statistical distribution) of the length of the specified label can be built from the training data. The "Street" label, for example, may have the following distribution:

| Length of label (# tokens) | Count |
|---|---|
| 2 | 4 |
| 3 | 80 |
| 4 | 150 |
| 5 | 300 |
| 6 | 20 |
| 7+ | 10 |

Herein, all "Street" segments that include seven or more tokens are aggregated in a single category; seven is, in this sense, the maximum tracked length for segments labeled "Street." The state machine 500 is structured so that it can learn to prefer the more frequent lengths.

The leaf-node state machine 500 includes, coming out of a start state 502, a directed chain 504 of K+1 states 506 (labeled N0 . . . NK) connected by K token-consuming transitions 508, where K may be the maximum tracked length or some smaller maximum length selected based on the statistical distribution (e.g., to lump together those longer labels that fall below a specified threshold in frequency). The K-th state has an associated token-consuming transition 509 back onto itself, which allows for sequences whose length exceed the maximum length. The chain 504 is non-cyclic in that none of the states 506 in the chain 504 has a transition back to an earlier state 506 in the chain 504. Rather, from any given state 506 within the chain 504, the state machine 500 can either advance to the next state 506 within the chain 504 (or remain at the last state) via a token-consuming transition 508, 509, or to the end state 510 of the state machine 500 via an epsilon transition 512. In this manner, a path through the state machine 500 "counts" the tokens labeled by the leaf-node label as it progresses through the chain 504, and the epsilon transition 512 at which the path leaves the chain 504 determines the length of the leaf-node label. The different epsilon transitions 512 can be weighted differently to account for the varying statistical likelihood of the respective label lengths. While it is possible, in principle, to weight each of the (epsilon as well as label-consuming) transitions within the state machine 500 independently from all others, it is often beneficial, in practice, to share weight functions (including their adjustable parameters) among multiple transitions to reduce the number of parameters to be learned in training. For example, all token-consuming transitions 508 may share the same weight functions and parameters, and the epsilon transitions 512 may be grouped into two or more groups of transitions based on the statistical distribution, with transitions within each group sharing a respective weight function and parameters for the group. The number of groups formed for the epsilon transitions 512 depends on the granularity with which label sequences of different lengths are to be distinguished based on their frequency of occurrence. The weight functions may be valuable even if they are constants (e.g., in the formula for $W_{et}$ above, equal to $C_e$, with all $\theta_{ip}$ being equal to zero) and, thus, independent from token features; in this case, the data may be used to learn a simple bias that prefers the frequent lengths. As a special case of constant weight functions, one or more of the epsilon transitions may receive a weight of zero, in a scenario where the total weight of the path is taken to be the product of the weights along the path, which, in effect, amounts to omitting those transitions altogether from the structure of the state machine 500.

As an example implementation of the state machine 500, FIG. 5B shows a state machine 550 for the "Street" label that is based on the example histogram given above. For purposes of determining the length of the non-cyclic directed chain of states 552 and the weights associated with the epsilon transitions from the chain 552 to the end state 554 of the state machine 550, the different "Street"-segment lengths in the histogram have been grouped into "frequent" and "infrequent" lengths based on the respective counts. "Frequent" lengths may be defined in relative terms based on a minimum fraction of the total number of counts of all sequences of the "Street" label and/or based on a minimum absolute count. For instance, taking label lengths that amount to at least 10% of the total count and occur each at least fifty times as "frequent," frequent lengths in the above histogram include sequences of three, four, or five tokens. Segments with only two tokens as well as segments with six or more tokens are deemed infrequent. Since "Street" segments of length one do not at all occur in the data, this length is deemed impossible. The state machine 550 captures these statistics in a directed chain of seven states (N0 through N6) with six token-consuming transitions therebetween, lumping all transitions beyond the sixth into the last state within the chain 552. The state machine 550 includes epsilon transitions to the end state 554 from any state in the chain 552 that corresponds to a segment of at least two tokens, and excludes a transition from the state N1 corresponding to a one-token segment. The epsilon transitions are grouped into transitions 556 for frequent lengths, which originate from states N3-N5, and transitions 558 for infrequent lengths, which originate from states N2 and N6. With this example grouping, the epsilon transitions 556 may share a first weight function, the epsilon transitions 558 may share a second weight function, and the token-consuming transitions 560 may share a third weight function.

Figure 6A:
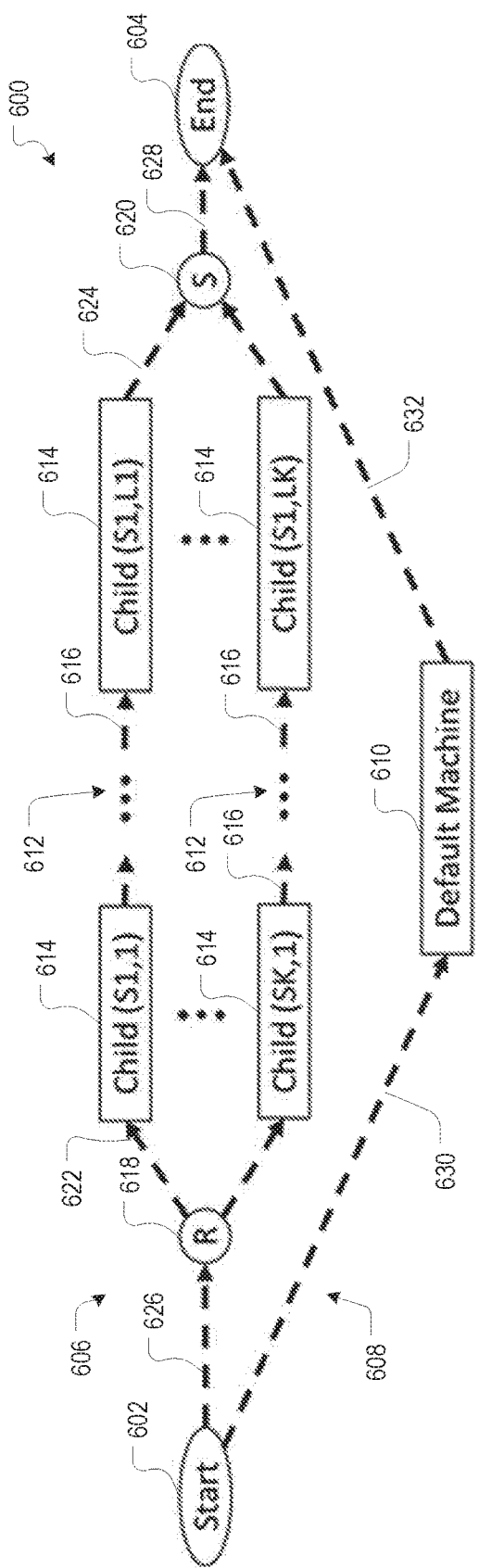
FIG. 6A is a diagram of the structure of an example non-leaf-node state machine, in accordance with various embodiments, for encoding a statistical distribution of unique sequences of child labels of a given non-leaf-node parent label.

FIG. 6A shows the structure of an example non-leaf-node state machine 600, in accordance with one embodiment, that can encode a statistical distribution of unique sequences of child labels of a given non-leaf-node parent label. Such child-label sequences can be listed and counted for any non-leaf-node label in the label hierarchy. In the address label hierarchy, the child sequences of the address label (corresponding, in this case, to the root node and only non-leaf node in the hierarchy) may have, for example, the following distribution:

| Child sequence | Count |
|---|---|
| [Street][City][State][Zip] | 210 |
| [Street][City][State] | 320 |
| [Street][Zip] | 30 |
| [Street][City][Zip] | 3 |
| [Zip][Street][City][State] | 1 |

As can be seen, not all permutations of child labels are represented in this distribution; those that are not correspond to child-label sequences with an associated count of zero. Given the statistical distribution of child label sequences, a subset of one or more "frequent sequences" can be determined based on a frequency threshold specified in terms of a fraction of the total count for all sequences and/or an absolute number of occurrences in the data. To leverage the frequent sequences, they may be represented, in the non-leaf-node state machine 600, by separate chains of composite states (or a single chain of composite states in the case of a single child-label sequence qualifying as frequent), whereas all child-label sequences that do not exceed the frequency threshold may be collectively represented by a composite state representing a non-leaf-node default state machine (e.g., state machine 400, 450) that does not impose any sequential constraints and also accepts "junk" tokens (i.e., tokens that are part of the parent segment, but not part of any of the child-label segments).

In more detail, as shown in FIG. 6A, the state machine 600 may branch, between the start state 602 and the end state 604, into two parallel paths: a path 606 representing the frequent child-label sequence(s) and a path 608 for the non-leaf-node default state machine 610. The path 606 for the frequent child-label sequences may, in turn, branch out into multiple parallel non-cyclic directed chains 612 of composite states 614 for multiple respective child-label sequences, herein denoted S1 through SK. The composite states 614 (denoted, for the j-th child-label sequence Sj, by Child (Sj, 1) through Child (Sj, Lj), where Lj is the number of composite states in the j-th sequence) represent sub-concept state machines for the respective child labels. In the case of leaf-node child labels, these sub-concept state machines may be, for example, standard state machines 200 or frequent-length-encoding state machines 500, depending on whether statistics on the length distribution of the child labels is to be taken into account. In the case of non-leaf-node child labels, the sub-concept state machines may be conventional non-leaf-node state machines 300, or may themselves reflect the structure of state machine 600, depending on whether frequent-sequence information is to be used at the child-node level. Each of the chains 612 may generally include one or more composite states 614; in many scenarios, at least one of the chains 612 has at least two composite states. Within each of the chains 612 representing frequent child-label sequences, the composite states 614 are connected by epsilon transitions 616. In order to allow for "junk" tokens to occur between the child labels in the frequent sequences, composite states for junk nodes (not shown) may be inserted between the composite states 614 as optional states, which can be circumvented via direct epsilon transitions from one child-label state to the next. Alternatively, tokens commonly considered "junk," such as, e.g., commas, may be labeled by a separate child label added to the label hierarchy and then treated as any other child, to enable explicitly accounting for their position within a sequence.

As shown, the chains 612 for all frequent child-label sequences S1 through SK may come out of a common state of origin R (618) and merge into a common destination state S (620) via respective epsilon transitions 622, 624, with R and S (618, 620) being connected via epsilon transitions 626, 628 to the start state 602 and end state 604 of the state machine 600, respectively. The default state machine 610 may be directly connected to the start state 602 and end state by epsilon transitions 630, 632, respectively. Different weights may be encoded for frequent and infrequent label sequences by assigning weight functions that differ between the epsilon transitions 626, 630 and/or between the epsilon transitions 628, 630. The transitions, from R and to S, of all frequent sequences S1 through SK may share a common weight. Alternatively, it is possible to weight different chains 612 of composite states 614 within the path 606 of frequent sequences differently by assigning different weight functions to respective epsilon transitions 622 or 624. The state machine 600 may also be modified, in an alternative embodiment, to transition directly from the start state 602 to each of the directed chains 612 and from each chain 612 directly to the end state 604, without intervening states R and S; different weights between frequent and infrequent label sequences may be achieved, in this case, by the weight functions assigned to the transitions going out from the start state 602 and/or going to the end state 604.

In the path 608 that represents the non-frequent sequences, any of various non-leaf-node default state machines may be used; examples include the default state machines 400 and 450, as well as a modification of state machine 450 in which all end states EK transition to either state R or state S. Note that, in the embodiment depicted in FIG. 6A, the default state machine 610 accepts all child-label sequences, including the frequent sequences explicitly represented in path 606. In alternative embodiments, the path 608 may be constructed to exclude all frequent sequences. For example, in between the start state 602 and the default state machine 610, a state machine that accepts only child labels other than those accepted by composite nodes Child (S1, 1) through Child (SK, 1) may be used as a "gate." In this case, transition paths from the various composite states 614 in the frequent-sequence path 606 to the default state machine 610 may be enabled, with similar restricting "gate" state machines in those transition paths.

Figure 6B:
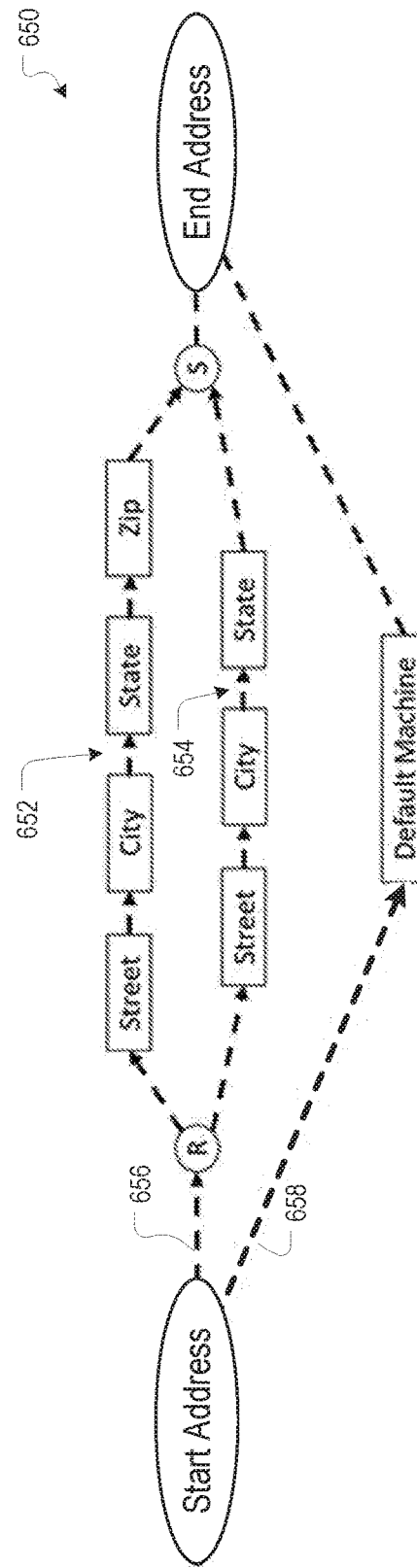
FIG. 6B is a diagram of an example implementation of the state machine of FIG. 6A for the "Address" hierarchy, in accordance with one embodiment.

FIG. 6B shows an example state machine 650 that implements the state machine 600 for the "Address" hierarchy based on the example child-sequence distribution provided above. In this example, child-label sequences that occur in at least one quarter of the total number of sequences and, in absolute numbers, at least one hundred times, are deemed frequent. Accordingly, the state machine 650 includes, within the path of frequent sequences, two child-label sequences 652, 654 for "Street-City-State-Zip" and "Street-City-State," respectively. The transition 656 to those frequent sequences 652, 654 is weighted differently than the transition 658 to the default machine 660.

The structure of the non-leaf-node state machine 600, in addition to encoding sequences of different child labels, may also be used, as an alternative to leaf-node state machine 500, to capture sequences of a single label differing in length. The frequent-length sequences may, in this case, form the chains 612 of composite states 614, where each composite state 614 may stand for a leaf-node state machine accepting only a single token (e.g., as compared with the state machine 200 with a token-consuming transaction from A to B, omitting an epsilon transition back to A). Other modifications and applications of the frequent-length and frequent-sequence-encoding state machines 500, 600 may occur to those of ordinary skill in the art.

From the state machines 500 and/or 600, optionally in combination with conventional state machines 200, 400, a hierarchical state machine can be constructed recursively by substituting composite states with the sub-concept state machines they represent. (Conventional state machines 200, 400 may be used, e.g., in instances where statistics on the length of leaf-node labels or on child-label sequences is not readily available.) Importantly, whenever the same sub-concept machine (e.g., state machine 500 or 600) appears multiple times in a state machine, each occurrence is a separate copy of the entire sub-concept state machine, which can quickly explode the size of the hierarchical state machine. In order to limit the resulting growth in complexity and the number of adjustable parameters to be trained, weight functions may be shared across the copies of any given sub-concept machine. Further, most transitions may be left unweighted (e.g., corresponding to a weight function of constant one if weights are to be multiplied along a path). For example, to discriminate between frequent and infrequent child-label sequences in the non-leaf-node state machine 600, it suffices to add a single weight function that is a simple bias term to the transition from the start state to the default state machine 610, thereby adding only one adjustable parameter to the hierarchical state machine.

Figure 7C:
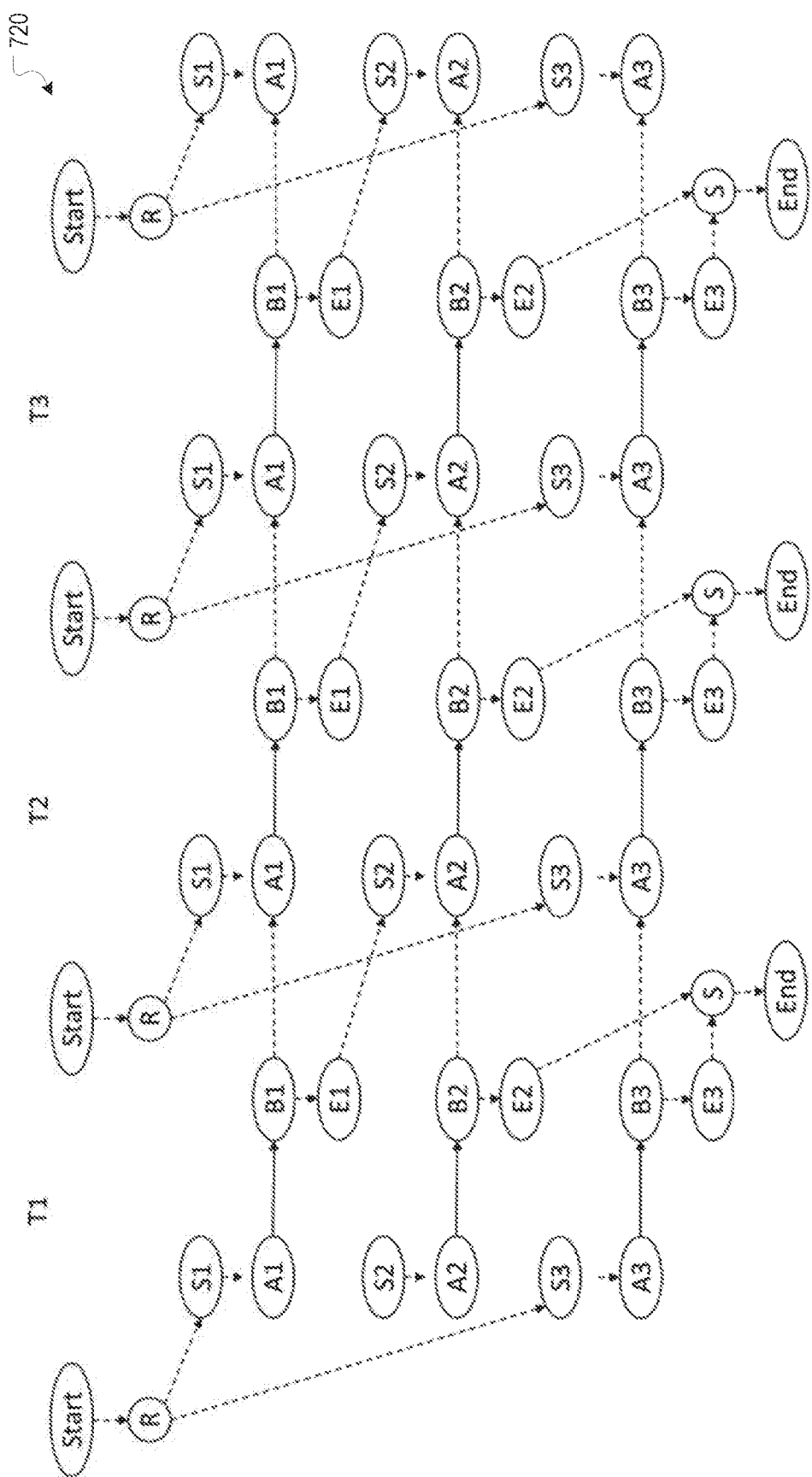
FIG. 7C is a diagram of a structure in which the state machine of FIG. 7B is aligned with a three-token sequence, in accordance with one embodiment.

FIGS. 7A-7C provide an example for rolling out a state machine 700 reflecting the basic structure of the frequent-sequence-encoding state machine 600. The state machine 700 itself is shown in FIG. 7A, and includes two chains for the frequent sequences "City-City" and "City," with composite states 702, 704, 706 for each of the child labels; the default state machine 610 is omitted from FIGS. 7A-7C for simplification. FIG. 7B shows the expanded state machine 710, in which individual standard sub-concept state machines 712, 714, 716 (structurally equivalent to the state machine 200 of FIG. 2) are substituted for the composite states 702, 704, 706, respectively. The states within each sub-concept state machine K (with K=1 . . . 3) are denoted SK for the start state, EK for the end state, and AK and BK for the states between which the token-consuming transition is formed. Note that transitioning to an "SK" state starts a new "City" label, which may have multiple tokens, and transitioning to an "EK" state corresponds to ending the label. FIG. 7C shows the expanded state machine 710 rolled out for a three-token document (omitting the states and transitions that go between Address and Not Address) (structure 720). Note that even if this graph were to be extended to the right indefinitely, there are no paths from Start to End that accept fewer than one or more than two City labels.

Having described various structural embodiments of frequent-length-encoding and frequent-sequence-encoding state machines in accordance herewith, a method for implementing a hierarchical extraction model for a given label hierarchy, in accordance with various embodiments, is described in the following with reference to FIG. 8. As shown, the method 800 includes determining, for a specified set of label sequences (or multiple such sets), a statistical distribution of the label sequences (or multiple respective distributions) as determined from training data comprising one or more labeled token sequences (act 802). In accordance with various embodiments, the set of label sequences includes sequences of a specified leaf-node label that differ from each other in length, or sequences of child nodes of a given non-leaf-node label. For purposes of determining which label sequences to explicitly represent in the hierarchical state machine and/or assigning weight functions to transitions within the state machine, the label sequences may be grouped based on their frequency of occurrence as reflected in the statistical distribution (act 804). For example, a subset of frequent label sequences may be formed of all label sequences that exceed a specified (relative or absolute) frequency threshold (e.g., a certain threshold number of counts or a certain threshold fraction of the total sequence count in the distribution). The label sequences below the frequency threshold (and any sequences under the non-leaf-node label that were not enumerated in the set of label sequences for which the distribution was obtained) may implicitly form a group of infrequent label sequences, or may be further divided up into multiple groups of differing frequencies of occurrence. The method 800 proceeds with the construction of a hierarchical state machine for the label hierarchy that includes, in one or more of its sub-concept state machines, one or more non-cyclic directed changes of states representing at least the subset of frequent label sequences (act 806). The transition within the sub-concept state machine(s) are weighted based on the statistical distribution (act 808). For example, the frequent and infrequent label sequences, or more generally the different groups of label sequences, may be assigned different respective weight functions.

Once the structure and weight functions of the hierarchical state machine have been determined, the hierarchical state machine can be trained to optimize its adjustable parameters, and thereafter used to determine the labels of a "test" sequence. In both the training phase and the test phase, the hierarchical state machine is rolled out to align its token-consuming transitions with the tokens of an input sequence (which is either a training sequence or a test sequence) (act 810). The weight functions can then be evaluated based on the features of the tokens (e.g., within a window including the token aligned with the respective weighted transition, if token-consuming, or aligned with the token-consuming transition preceding or following the respective epsilon transition) to determine the weights of the transitions in the hierarchical state machine (act 812). A weight for each path through the aligned state machine that ends at the last token of the input sequence is determined by the weights of the individual transitions within the path, and may be, e.g., the product of the transition weights. The hierarchical state machine may be searched for the highest-weight path (e.g., using the Viterbi algorithm), or path probabilities for multiple paths may be determined (e.g., using CFR to model the path probabilities) (act 814).

In the training phase, the input sequences are at least partially labeled training sequences, which may be, but need not be, taken from or include the labeled token sequences from which the statistical distributions were determined. In other words, the statistical distribution of label sequences and the parameters of the weight functions may be determined from the same training data, or from different sets of training data (a first set of training data for determining the statistical distributions and a second set of training data for training the weight-function parameters). To train the parameters, labels assigned to the input training sequence based on the highest-weight path, or based on multiple paths weighted by their respective path probabilities, are compared against the labels provided along with the input training sequences to evaluate a loss function (act 816), and the parameters of the weight functions are iteratively adjusted (act 818) to minimize that loss function. Upon completion of the training, when the parameter values are fixed, the highest-weight path may be determined for a test input sequence, which can then be labeled in accordance with the labels along that path (act 820).

Figure 8:
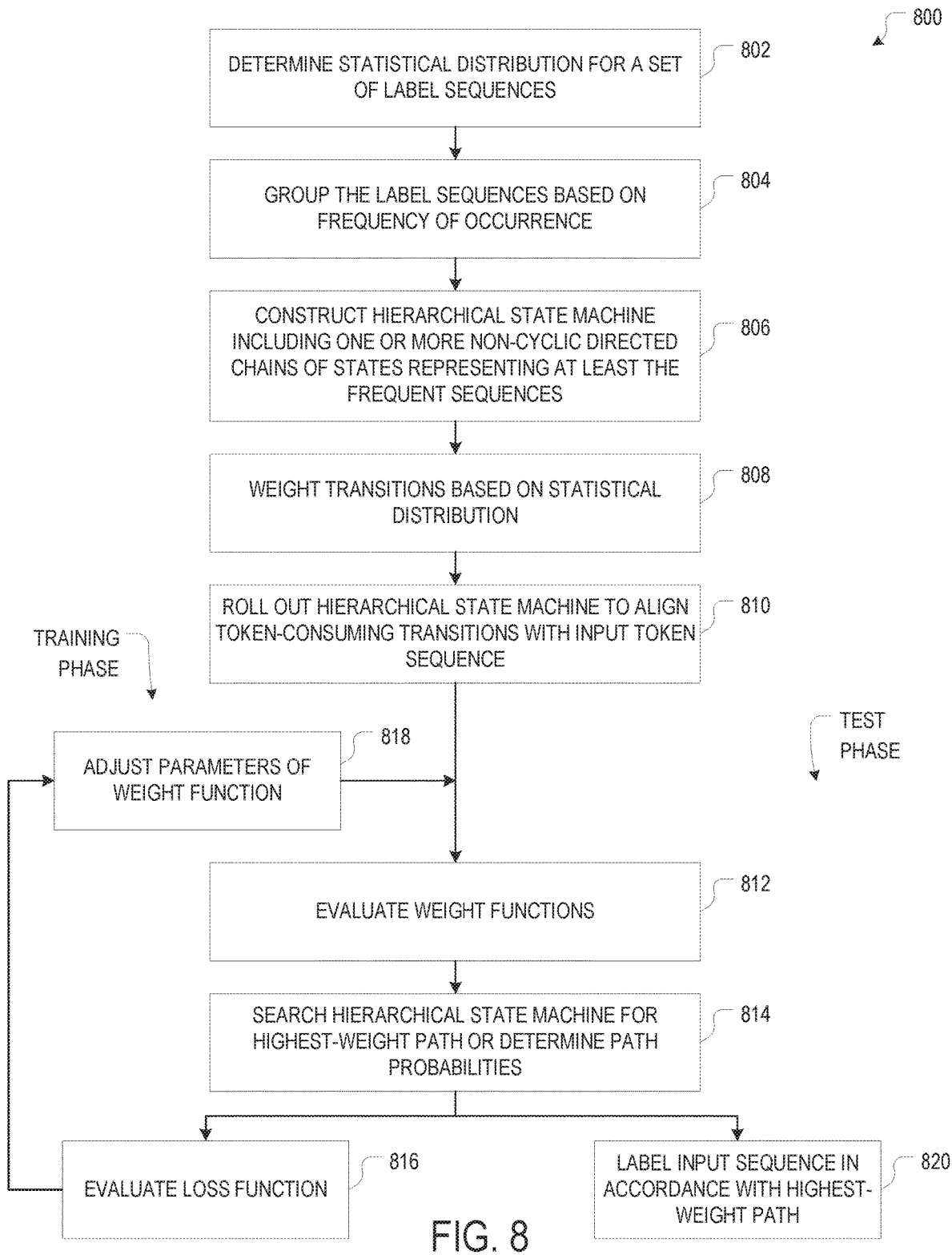
FIG. 8 is a flow chart of a method for implementing a hierarchical extraction model for a given label hierarchy, in accordance with various embodiments.
Figure 9:
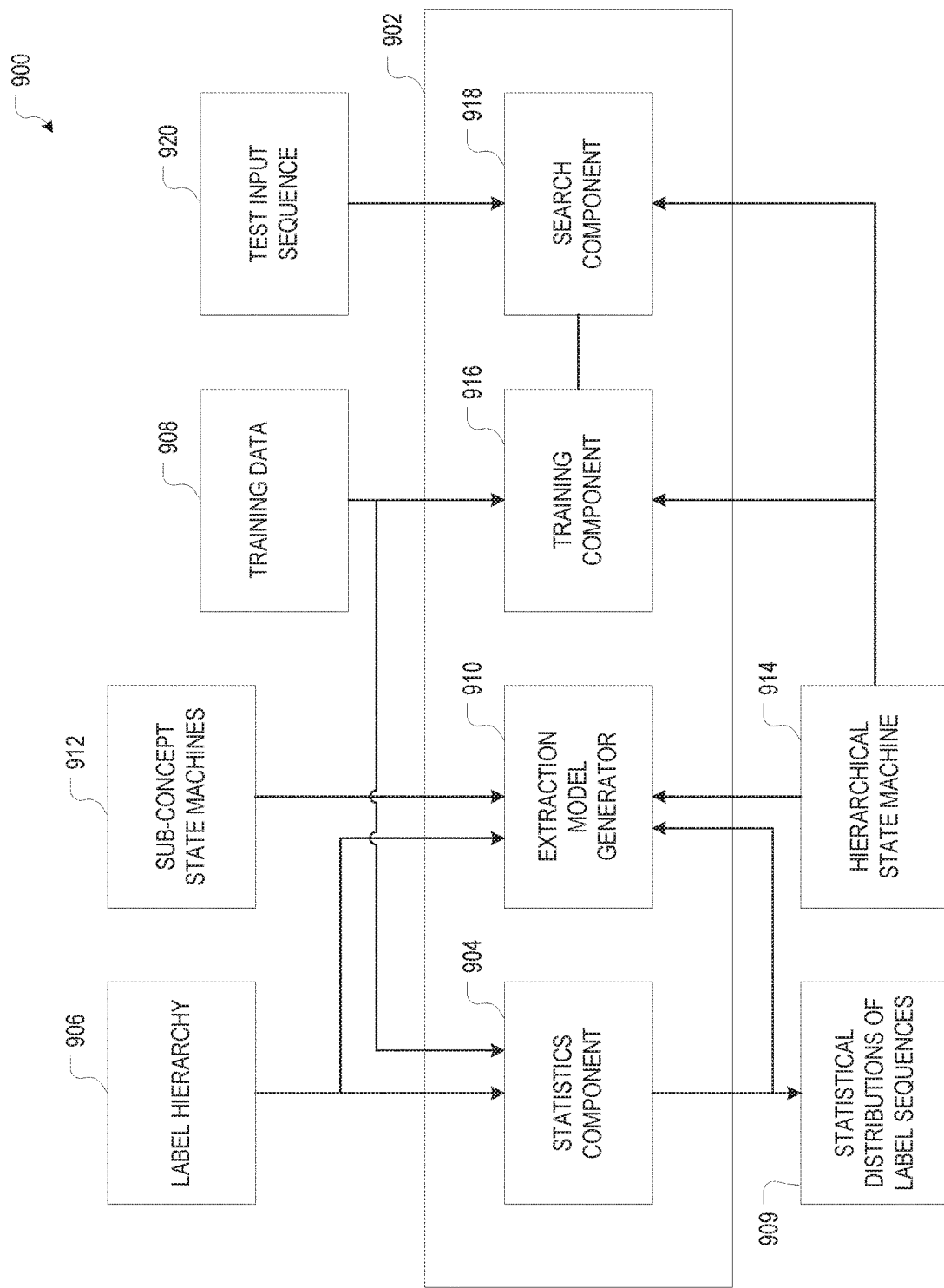
FIG. 9 is a block diagram of an example system for implementing a hierarchical extraction model for a given label hierarchy, in accordance with various embodiments.

The method of FIG. 8 can generally be implemented with any suitable combination of computing hardware, software, and/or firmware, such as with software executed by one or more hardware processors of a computing system. The overall functionality provided may be grouped into a number of functional components. FIG. 9 depicts, in block diagram form, an example system 900 including a plurality of (e.g., software-implemented) processing components 902, along with the data on which they operate. The data and, if software-implemented, the processing components 902 may be stored in one or more computer-readable media. Among the processing components 902, a statistics component 904, given a data structure representing a particular label hierarchy 906, serves to derive, from training data 908 comprising one or more token sequences labeled in accordance with the label hierarchy 906, one or more statistical distribution 909 of one or more sets of label sequences. An extraction-model generator 910 obtains the statistical distribution(s) 909 and, based on a stored definition of a set of available sub-concept state machines 912 (including, e.g., state machines 500, 600), constructs a representation of a hierarchical state machine 914 therefrom. A training component 916 operating on the training data 908 can use machine learning to determine the weights associated with the representation of the hierarchical state machine 914. A search component 918 with access to the representation of the hierarchical state machine 914, upon being called by the training component 916 or invoked during the test phase to label a test input sequence 920, can determine the highest-weight path (or path probabilities for multiple paths) through the hierarchical state machine as aligned with a training input sequence or a test input sequence 920. Functionality for rolling out and aligning the hierarchical state machine with the input sequence may be included in the training component 916 and/or the search component 918, or provided separately. The representation of the hierarchical state machine 914 may be exportable to a text or image file (with exporting functionality included, e.g., in the extraction model generator) for viewing by a human or input into another component or computing system. Of course, the depicted organization into components is merely an example, and other ways of grouping the functionality for building, training, and using hierarchical extraction models as described herein are possible.

In principle, functional components/modules implementing the approach described herein can constitute either software components (e.g., code embodied on a non-transitory machine-readable medium) or hardware-implemented components/modules. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 10:
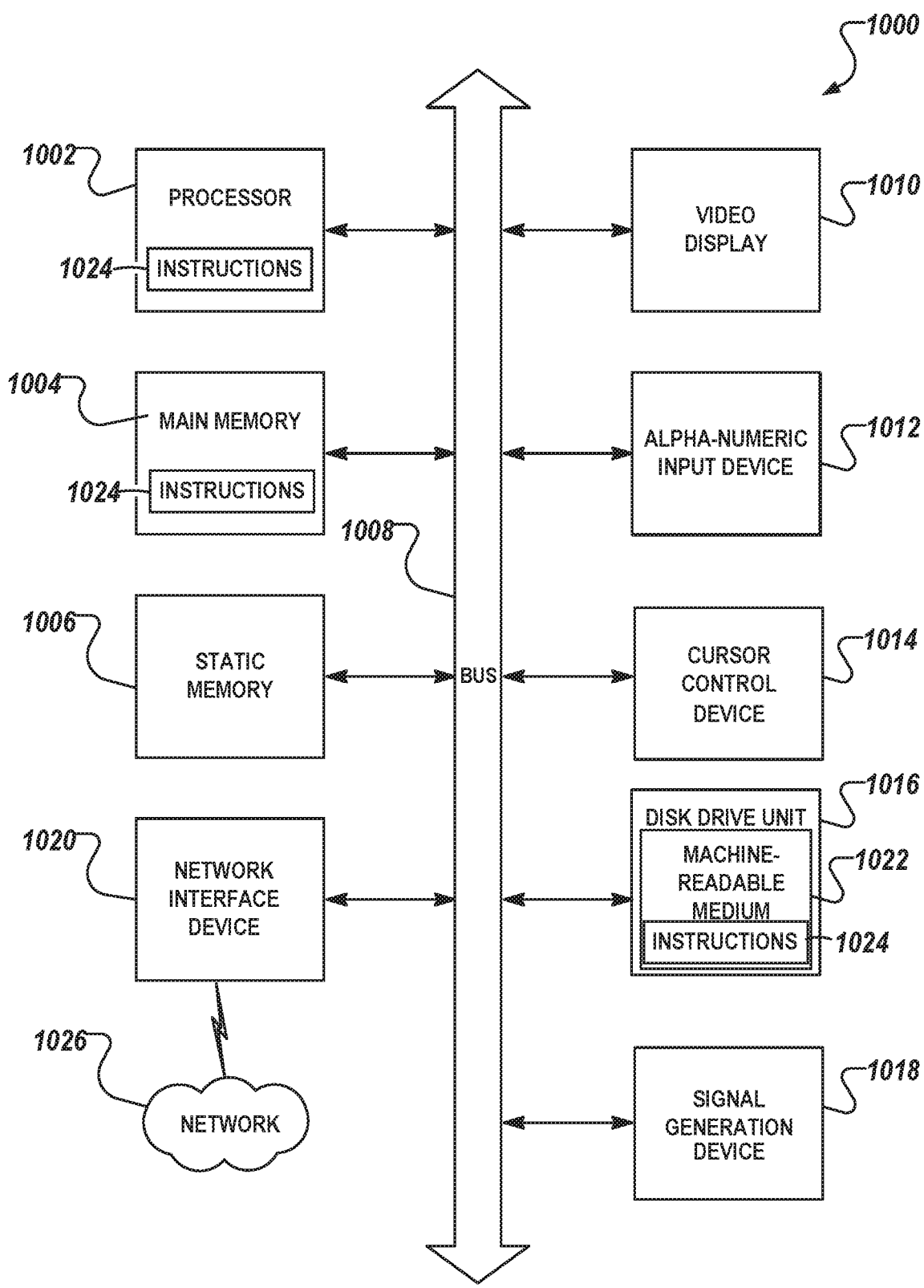
FIG. 10 is a block diagram of a machine in the example form of a computer system within which instructions may be executed to cause the machine to perform any one or more of the methodologies discussed herein.

FIG. 10 is a block diagram of a machine in the example form of a computer system 1000 within which instructions 1024 (e.g., of the processing components 902) may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 can further include a video display 1010 (e.g., a liquid crystal display (LCD) or a cathode ray tube (CRT)). The computer system 1000 also includes an alpha-numeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

The disk drive unit 1016 includes a machine-readable medium 1022 on which are stored one or more sets of data structures and instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, with the main memory 1004 and the processor 1002 also constituting machine-readable media.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1024 can be transmitted or received over a communication network 1026 using a transmission medium. The instructions 1024 can be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

The following numbered embodiments are illustrated embodiments.

Example 1. A method for implementing a hierarchical extraction model for a label hierarchy, the method comprising: obtaining, for a set of label sequences, a statistical distribution of the label sequences as determined from training data comprising one or more labeled token sequences; and, using one or more hardware processors, executing instructions to automatically generate a weighted hierarchical state machine implementing the hierarchical extraction model for the label hierarchy and comprising a sub-concept state machine that includes one or more non-cyclic directed chains of simple or composite states representing at least a subset of the label sequences, transitions within the sub-concept state machine being weighted based at least in part on the statistical distribution.

Example 2. The method of example 1, wherein the set of label sequences comprises sequences of a specified leaf-node label that differ from each other in length.

Example 3. The method of example 2, wherein the subset of sequences of the specified leaf-node label comprises sequences up to a maximum length not smaller than two, and is represented by a non-cyclic directed chain of simple states connected to each other by token-consuming transitions equal in number to the maximum length, a plurality of the simple states within the chain being connected to an end state of the sub-concept state machine by a plurality of respective epsilon transitions, the epsilon transitions being weighted based at least in part on the statistical distribution.

Example 4. The method of example 3, wherein the epsilon transitions are grouped, based on the statistical distribution, into two or more groups of epsilon transitions, the groups comprising a group of transitions corresponding to label sequence that exceed a specified frequency threshold, the two or more groups being weighted by two or more respective weight functions, each weight function being shared by all epsilon transitions within the respective group.

Example 5. The method of example 1, wherein the set of label sequences comprises sequences of child labels of a specified non-leaf-node label.

Example 6. The method of example 5, wherein the subset of sequences of child labels comprises only one or more sequences of child labels of the specified non-leaf-node label that exceed a specified frequency threshold as determined from the statistical distribution.

Example 7. The method of example 6, wherein the one or more non-cyclic directed chains comprise, for the one or more sequences exceeding the specified frequency threshold, one or more respective separate chains of composite states, the sub-concept state machine further comprising a default state machine accepting all sequences consistent with the specified non-leaf-node label that are not within the subset, connected between a start state and an end state of the sub-concept state machine in parallel with the one or more separate chains of composite states.

Example 8. The method of example 7, wherein an epsilon transition from at least one of the start state or the end state of the sub-concept state machine to the one or more non-cyclic directed chains of composite states is weighted differently than an epsilon transition from at least one of the start state or the end state of the sub-concept state machine to the default machine.

Example 9. The method of any of examples 1 through 8, wherein at least one of the one or more non-cyclic directed chains comprises at least two token-consuming transitions.

Example 10. The method of any of examples 1 through 9, further comprising rolling out the hierarchical state machine to align token-consuming ones of the transitions with tokens of an input sequence of tokens and evaluating weight functions assigned to the transitions of the hierarchical state machine based on features of the tokens in the input sequence.

Example 11. The method of example 10, wherein the input sequence is a test sequence of unlabeled tokens, the method further comprising determining a highest-weight path through the rolled-out hierarchical state machine and labeling the tokens of the input sequence in accordance with the determined highest-weight path.

Example 12. The method of example 10, wherein the input sequence is an at least partially labeled training sequence, the method further comprising using machine learning to iteratively adjust parameters of the weight functions and repeat evaluating the weight functions to minimize a loss function evaluated based on labels of the input sequence in conjunction with path probabilities computed from the evaluated weight functions.

Example 13. The method of example 12, wherein the path probabilities are computed using a conditional-random-field model.

Example 14. The method of any one of examples 1-13, further comprising generating a textual or graphic representation of a structure of the generated hierarchical state machine for storage in memory or display to a user.

Example 15. A system comprising: one or more hardware processors; and one or more machine-readable media storing a data structure representing a label hierarchy and a plurality of software components for execution by the one or more hardware processors. The software components comprise: a statistics component configured to determine, from training data comprising one or more token sequences labeled in accordance with the label hierarchy, a statistical distribution of a specified set of label sequences; and an extraction-model generator configured to generate a data structure representing a weighted hierarchical state machine implementing a hierarchical extraction model for the label hierarchy, the hierarchical state machine comprising a sub-concept state machine that includes one or more non-cyclic directed chains of simple or composite states representing at least a subset of the label sequences, and to assign weight functions that are at least in part based on the statistical distribution to transitions within the sub-concept state machine.

Example 16. The system of example 15, wherein the set of label sequences comprises sequences of a specified leaf-node label that differ from each other in length and wherein the subset of sequences of the specified leaf-node label comprises sequences up to a maximum length not smaller than two, the subset of sequences being represented by a non-cyclic directed chain of simple states connected to each other by token-consuming transitions equal in number to the maximum length, a plurality of the simple states within the chain being connected to an end state of the sub-concept state machine by a plurality of respective epsilon transitions, weight functions assigned to the epsilon transitions being based at least in part on the statistical distribution.

Example 17. The system of example 15, wherein the set of label sequences comprises sequences of child labels of a specified non-leaf-node label and the subset of sequences of child labels comprises only one or more sequences of child labels of the specified non-leaf-node label that exceed a specified frequency threshold as determined from the statistical distribution, the one or more non-cyclic directed chains comprising, for the one or more sequences exceeding the specified frequency threshold, one or more respective separate chains of composite nodes, at least one of the chains comprising multiple composite nodes, the sub-concept state machine further comprising a default state machine accepting all sequences consistent with the specified non-leaf-node label that are not within the subset, connected between a start state and an end state of the sub-concept state machine in parallel with the separate chains of composite nodes.

Example 18. The system of any of examples 15-17, wherein the software components further comprise: a training component configured to use machine learning to determine adjustable parameters of the weight functions based on one or more at least partially labeled input sequences of tokens.

Example 19. The system of any of examples 15-18, wherein the software components further comprise: a search component configured to determine a highest-weight path through the hierarchical state machine.

Example 20. One or more machine-readable media storing instructions for execution by one or more hardware processors, the instructions, when executed by the one or more hardware processors, causing the one or more hardware processors to perform operations implementing a hierarchical extraction model for a label hierarchy based in part on a statistical distribution of a set of label sequences as determined from training data. The operations comprise: automatically generating a weighted hierarchical state machine implementing the hierarchical extraction model for the label hierarchy and comprising a sub-concept state machine that includes one or more non-cyclic directed chains of simple or composite states representing at least a subset of the label sequences; and weighting transitions within the sub-concept state machine based at least in part on the statistical distribution.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for implementing a hierarchical extraction model for a label hierarchy, the method comprising:
    obtaining, for a set of label sequences associated with a given concept or sub-concept in the label hierarchy, a statistical distribution of the label sequences, the statistical distribution corresponding to numbers of occurrences, in training data comprising one or more labeled token sequences, of the label sequences in the set; and
    using one or more hardware processors, executing instructions to automatically generate, without human input, a weighted hierarchical state machine implementing the hierarchical extraction model for the label hierarchy, the hierarchical state machine comprising a sub-concept state machine for the given concept or sub-concept that includes one or more non-cyclic directed chains of simple or composite states that provide multiple non-cyclic paths from a start state to an end state, the multiple non-cyclic paths representing multiple of the label sequences, wherein transitions within the sub-concept state machine at branching points between the multiple paths are weighted based at least in part on the statistical distribution; and
    storing a representation of the weighted hierarchical state machine in memory for subsequent use in labeling an input sequence.

2. The method of claim 1, wherein the set of label sequences is associated with a given sub-concept and comprises sequences of a specified leaf-node label for the given sub-concept that differ from each other in length.

3. The method of claim 2, wherein the multiple of the label sequences represented by the multiple non-cyclic paths comprise sequences of the specified leaf-node label having a maximum length not smaller than two, the sub-concept state machine including a non-cyclic directed chain of simple states connected to each other by token-consuming transitions equal in number to the maximum length, a plurality of the simple states within the chain being connected to the end state of the sub-concept state machine by a plurality of respective epsilon transitions, and the epsilon transitions being weighted based at least in part on the statistical distribution.

4. The method of claim 3, wherein the epsilon transitions are grouped, based on the statistical distribution, into two or more groups of epsilon transitions, the two or more groups comprising a group of transitions corresponding to label sequences that exceed a specified frequency threshold, the two or more groups being weighted by two or more respective weight functions, and each weight function being shared by all epsilon transitions within the respective group.

5. The method of claim 1, wherein the set of label sequences is associated with a given concept and comprises sequences of child labels of a specified non-leaf-node label for the given concept.

6. The method of claim 5, wherein the multiple of the label sequences represented by the multiple non-cyclic paths comprise only one or more sequences of child labels of the specified non-leaf-node label that exceed a specified frequency threshold as determined from the statistical distribution.

7. The method of claim 6, wherein the one or more non-cyclic directed chains comprise, for the one or more sequences exceeding the specified frequency threshold, one or more respective separate chains of composite states, the sub-concept state machine further comprising a default state machine accepting all sequences consistent with the specified non-leaf-node label that are not within the multiple sequences of child labels, connected between the start state and the end state of the sub-concept state machine in parallel with the one or more separate chains of composite states.

8. The method of claim 7, wherein an epsilon transition from at least one of the start state or the end state of the sub-concept state machine to the one or more non-cyclic directed chains of composite states is weighted differently than an epsilon transition from at least one of the start state or the end state of the sub-concept state machine to the default machine.

9. The method of claim 1, wherein at least one of the one or more non-cyclic directed chains comprises at least two token-consuming transitions.

10. The method of claim 1, further comprising executing instructions to roll out the hierarchical state machine to align token-consuming ones of the transitions with tokens of an input sequence of tokens and to evaluate weight functions assigned to the transitions of the hierarchical state machine based on features of the tokens in the input sequence.

11. The method of claim 10, wherein the input sequence is a test sequence of unlabeled tokens, the method further comprising determining a highest-weight path through the rolled-out hierarchical state machine and labeling the tokens of the input sequence in accordance with the determined highest-weight path.

12. The method of claim 10, wherein the input sequence is an at least partially labeled training sequence, the method further comprising using machine learning to iteratively adjust parameters of the weight functions and repeat evaluating the weight functions to minimize a loss function evaluated based on labels of the input sequence in conjunction with path probabilities computed from the evaluated weight functions.

13. The method of claim 12, wherein the path probabilities are computed using a conditional-random-field model.

14. The method of claim 1, further comprising executing instructions to generate a textual or graphic representation of a structure of the generated hierarchical state machine for display to a user.

15. A system comprising:
one or more hardware processors; and
one or more non-transitory machine-readable media storing a data structure representing a label hierarchy and instructions for execution by the one or more hardware processors, the instructions causing the one or more hardware processors to perform operations comprising:
determining, from training data comprising one or more token sequences labeled in accordance with the label hierarchy, a statistical distribution of a specified set of label sequences associated with a given concept or sub-concept in the label hierarchy, the statistical distribution corresponding to numbers of occurrences, in the training data, of the label sequences in the specified set;
automatically generating, without human input, a data structure representing a weighted hierarchical state machine implementing a hierarchical extraction model for the label hierarchy, the hierarchical state machine comprising a sub-concept state machine for the given concept or sub-concept that includes one or more non-cyclic directed chains of simple or composite states that provide multiple non-cyclic paths from a start state to an end state, the multiple non-cyclic paths representing multiple of the label sequences;
assigning weight functions that are at least in part based on the statistical distribution to transitions within the sub-concept state machine at branching points between the multiple paths; and
causing the data structure representing the weighted hierarchical state machine to be stored in memory for subsequent use in labeling an input sequence.

16. The system of claim 15, wherein the set of label sequences is associated with a given sub-concept and comprises sequences of a specified leaf-node label for the given sub-concept that differ from each other in length, and wherein the multiple of the label sequences represented by the multiple non-cyclic paths comprise sequences of the specified leaf-node label up to a maximum length not smaller than two, the sub-concept state machine including a non-cyclic directed chain of simple states connected to each other by token-consuming transitions equal in number to the maximum length, a plurality of the simple states within the chain being connected to the end state of the sub-concept state machine by a plurality of respective epsilon transitions, weight functions assigned to the epsilon transitions being based at least in part on the statistical distribution.

17. The system of claim 15, wherein the set of label sequences is associated with a given concept and comprises sequences of child labels of a specified non-leaf-node label for the given concept, and the multiple of the label sequences represented by the multiple non-cyclic paths comprises only one or more sequences of child labels of the specified non-leaf-node label that exceed a specified frequency threshold as determined from the statistical distribution, the one or more non-cyclic directed chains comprising, for the one or more sequences exceeding the specified frequency threshold, one or more respective separate chains of composite nodes, at least one of the chains comprising multiple composite nodes, the sub-concept state machine further comprising a default state machine accepting all sequences consistent with the specified non-leaf-node label that are not within the multiple of the label sequences represented by the multiple non-cyclic paths, connected between the start state and the end state of the sub-concept state machine in parallel with the separate chains of composite nodes.

18. The system of claim 15, wherein the operations further comprise:
using machine learning to determine adjustable parameters of the weight functions based on one or more at least partially labeled input sequences of tokens.

19. The system of claim 15, wherein the operations further comprise:
determining a highest-weight path through the hierarchical state machine.

20. One or more non-transitory machine-readable media storing instructions for execution by one or more hardware processors, the instructions, when executed by the one or more hardware processors, causing the one or more hardware processors to perform operations implementing a hierarchical extraction model for a label hierarchy based in part on a statistical distribution of a specified set of label sequences associated with a given concept or sub-concept in the label hierarchy as determined from training data, the statistical distribution corresponding to numbers of occurrences, in the training data, of the label sequences in the specified set; the operations comprising:
automatically generating, without human input, a weighted hierarchical state machine implementing the hierarchical extraction model for the label hierarchy and comprising a sub-concept state machine for the given concept or sub-concept that includes one or more non-cyclic directed chains of simple or composite states that provide multiple non-cyclic paths from a start state to an end state, the multiple non-cyclic paths representing multiple of the label sequences;

weighting transitions within the sub-concept state machine at branching points between the multiple paths based at least in part on the statistical distribution; and causing a representation of the weighted hierarchical state machine to be stored in memory for subsequent use in labeling an input sequence.

\* \* \* \* \*